US009405787B2

(12) United States Patent
Takenouchi

(10) Patent No.: US 9,405,787 B2
(45) Date of Patent: Aug. 2, 2016

(54) DISTRIBUTED ANONYMIZATION SYSTEM, DISTRIBUTED ANONYMIZATION DEVICE, AND DISTRIBUTED ANONYMIZATION METHOD

(75) Inventor: Takao Takenouchi, Tokyo (JP)

(73) Assignee: NEC Corporation, Tokyo (JP)

( * ) Notice: Subject to any disclaimer, the term of this patent is extended or adjusted under 35 U.S.C. 154(b) by 218 days.

(21) Appl. No.: 14/123,467

(22) PCT Filed: May 24, 2012

(86) PCT No.: PCT/JP2012/064016
§ 371 (c)(1),
(2), (4) Date: Dec. 2, 2013

(87) PCT Pub. No.: WO2012/165518
PCT Pub. Date: Dec. 6, 2012

(65) Prior Publication Data
US 2014/0122442 A1 May 1, 2014

(30) Foreign Application Priority Data
Jun. 2, 2011 (JP) .................................. 2011-124398

(51) Int. Cl.
*G06F 17/00* (2006.01)
*G06F 17/30* (2006.01)
(Continued)

(52) U.S. Cl.
CPC ........ *G06F 17/30371* (2013.01); *G06F 21/556* (2013.01); *G06F 21/6254* (2013.01); *G06F 21/6263* (2013.01); *H04L 63/0421* (2013.01); *G06F 2221/2117* (2013.01)

(58) Field of Classification Search
CPC ..................................................... G06F 17/30
USPC ................................................. 707/600–899
See application file for complete search history.

(56) References Cited

U.S. PATENT DOCUMENTS

| 2007/0226774 A1* | 9/2007 | Pardo-Blazquez ...... H04L 67/16 726/1 |
| 2007/0263632 A1 | 11/2007 | Sobue et al. |
| 2010/0114920 A1 | 5/2010 | Srivastava et al. |

FOREIGN PATENT DOCUMENTS

| JP | 2006-053711 | 2/2006 |
| JP | 2007-264730 | 10/2007 |

OTHER PUBLICATIONS

Mohammed, N. et al., "Privacy Preserving Data Mashup", EDBT 2009 Proceedings of the 12th International Conference on Extending Database Technology: Advances in Database Technology, 2009, 12 pages.

(Continued)

*Primary Examiner* — Isaac M Woo
(74) *Attorney, Agent, or Firm* — Wilmer Cutler Pickering Hale and Dorr LLP

(57) ABSTRACT

The present invention provides a distributed anonymization device capable of executing a distributed anonymization process without the risk of leaking data of users to other parties. This distributed anonymization device is provided with: a storing means for storing a user identifier and personal information in association with one another; a setting means for setting, as a dummy identifier, the identifier that does not correspond to the user identifier from among all of the externally-notified identifiers; a separating means for separating all the identifiers including the dummy identifier into groups; a transmitting means for transmitting to another device, the separation information indicating the content of the identifiers in each group; and a determining means for determining, each of groups, whether the proportion of identifiers in the abovementioned distributed anonymization device and the other device satisfy a predetermined anonymity index.

13 Claims, 30 Drawing Sheets

(51) Int. Cl.
  *G06F 21/55* (2013.01)
  *G06F 21/62* (2013.01)
  *H04L 29/06* (2006.01)

(56) References Cited

OTHER PUBLICATIONS

Muramoto, S. et al., "Minimization of Data Distortion on a Privacy Protection Technique against Attacks Using Background Knowledge", The Institute of Electronics, Information and Communication Engineers Dai 19 Kai Data Kogaku Workshop Ronbunshu [online] DEW2008 Data Engineering Workshop Miyazaki, Apr. 7, 2008, p. 1-8.

"Open ID Authentication 2.0—Final" OpenID Foundation, 2007, retrieved on Nov. 25, 2013 from <http://openid.net/pecs/openid-authentication-2_0.hitml>, 36 pages.

International Search Report corresponding to PCT/JP2012/064016, dated Jun. 28, 2012, 5 pages.

Written Opinion of the International Search Authority corresponding to PCT/JP2012/064016, mailing date Jul. 10, 2012, 2 pages.

Chida, K. et al, Cahllenges in Group-Based Anonymization on Cloud, IEICE Technical Report, vol. 111, No. 30, May 5, 2011, p. 117-122.

Japanese Office Action issued in corresponding Japanese Patent Application No. 2013-518146, dated May 31, 2016, 4 pages.

* cited by examiner

Fig.5

| ID | BODY HEIGHT | DISEASE |
|---|---|---|
| user1 | 160 | CANCER |
| user2(DUMMY) | - | - |
| user3 | 162 | HEART DISEASE |
| user4(DUMMY) | - | - |
| user5 | 165 | CANCER |
| user6(DUMMY) | - | - |
| user7 | 168 | HEART DISEASE |
| user8 | 172 | CANCER |
| user9(DUMMY) | - | - |
| user10 | 175 | HEART DISEASE |
| user11 | 178 | CANCER |
| user12 | 179 | HEART DISEASE |

Fig.6

| ID | BODY HEIGHT | DISEASE |
|---|---|---|
| user1 | 160 | CANCER |
| user2 (DUMMY) | 161 | CANCER |
| user3 | 162 | HEART DISEASE |
| user4 (DUMMY) | 163 | HEART DISEASE |
| user5 | 165 | CANCER |
| user6 (DUMMY) | 166 | CANCER |
| user7 | 168 | HEART DISEASE |
| user8 | 172 | CANCER |
| user9 (DUMMY) | 171 | HEART DISEASE |
| user10 | 175 | HEART DISEASE |
| user11 | 178 | CANCER |
| user12 | 179 | HEART DISEASE |

Fig.7

| AGE | BODY HEIGHT | DISEASE | ID | THE NUMBER OF DUMMIES |
|---|---|---|---|---|
| ? | any | CANCER, HEART DISEASE | user1-12 | 4 |

Fig.8

| AGE | BODY HEIGHT | DISEASE | ID | THE NUMBER OF DUMMIES |
|---|---|---|---|---|
| any | ? | ? | user1~12 | 0 |

Fig.9

| AGE | BODY HEIGHT | DISEASE | ID | THE NUMBER OF DUMMIES |
|---|---|---|---|---|
| ? | -170 | CANCER, HEART DISEASE | user1-7 | 3 |
| ? | 170- | CANCER, HEART DISEASE | user8-12 | 1 |

Fig.10

| AGE | BODY HEIGHT | DISEASE | ID | THE NUMBER OF DUMMIES |
|---|---|---|---|---|
| any | ? | ? | user1-7 | 0 |
| any | ? | ? | user8-12 | 0 |

Fig.11

| AGE | BODY HEIGHT | DISEASE | ID | THE NUMBER OF DUMMIES |
|---|---|---|---|---|
| -30 | ? | ? | user1-3 | 0 |
| 30- | ? | ? | user4-7 | 0 |
| 30- | ? | ? | user8-12 | 0 |

Fig.12

| AGE | BODY HEIGHT | DISEASE | ID | THE NUMBER OF DUMMIES |
|---|---|---|---|---|
| ? | -170 | CANCER, HEART DISEASE | user1-3 | 1 |
| ? | -170 | CANCER, HEART DISEASE | user4-7 | 2 |
| ? | 170- | CANCER, HEART DISEASE | user8-12 | 1 |

Fig.13

| AGE | BODY HEIGHT | DISEASE | ID | THE NUMBER OF DUMMIES |
|---|---|---|---|---|
| -30 | ? | ? | user1-3 | 0 |
| 30-40 | ? | ? | user4-7 | 0 |
| 30-40 | ? | ? | user8-10 | 0 |
| 40- | ? | ? | user11-12 | 0 |

Fig.14

| AGE | BODY HEIGHT | DISEASE | ID | THE NUMBER OF DUMMIES |
|---|---|---|---|---|
| ? | -170 | CANCER, HEART DISEASE | user1-3 | 1 |
| ? | -170 | CANCER, HEART DISEASE | user4-7 | 2 |
| ? | 170- | CANCER, HEART DISEASE | user8-10 | 1 |
| ? | 170- | CANCER, HEART DISEASE | user11-12 | 0 |

Fig.15

| AGE | BODY HEIGHT | THE NUMBER OF EXISTING PERSONS | BREAKDOWN |
|---|---|---|---|
| -30 | -170 | TWO PERSONS | HEART DISEASE ONE PERSON, CANCER ONE PERSON |
| 30- | -170 | TWO PERSONS | HEART DISEASE ONE PERSON, CANCER ONE PERSON |
| 30- | 170- | FOUR PERSONS | HEART DISEASE TWO PERSON, CANCER TWO PERSON |

Fig.16

| AGE | BODY HEIGHT | DISEASE |
|---|---|---|
| -30 | -170 | HEART DISEASE |
| -30 | -170 | CANCER |
| 30- | -170 | HEART DISEASE |
| 30- | -170 | CANCER |
| 30- | 170- | HEART DISEASE |
| 30- | 170- | HEART DISEASE |
| 30- | 170- | CANCER |
| 30- | 170- | CANCER |

Fig.18

| ID | BODY HEIGHT | DISEASE |
|---|---|---|
| user1 | 155 | CANCER |
| user2(DUMMY) | 158 | - |
| user3 | 162 | HEART DISEASE |
| user4(DUMMY) | 166 | - |
| user5 | 175 | CANCER |
| user6(DUMMY) | 176 | - |
| user7 | 181 | HEART DISEASE |
| user8 | 183 | CANCER |
| user9(DUMMY) | 183 | - |
| user10 | 184 | HEART DISEASE |
| user11(DUMMY) | 185 | - |
| user12 | 188 | HEART DISEASE |

Fig.19

| ID | BODY HEIGHT | DISEASE |
|---|---|---|
| user1 | 155 | CANCER |
| user2(DUMMY) | 156~161 | - |
| user3 | 162 | HEART DISEASE |
| user4(DUMMY) | 162~174 | - |
| user5 | 175 | CANCER |
| user6(DUMMY) | 176~180 | - |
| user7 | 181 | HEART DISEASE |
| user8 | 183 | CANCER |
| user9(DUMMY) | 183 | - |
| user10 | 184 | HEART DISEASE |
| user11(DUMMY) | 184~187 | - |
| user12 | 188 | HEART DISEASE |

Fig.20

| ID | BODY HEIGHT | DISEASE |
|---|---|---|
| user1 | 172 | CANCER |
| user2 (DUMMY) | - | - |
| user3 (DUMMY) | - | - |
| user4 | 175 | HEART DISEASE |
| user5 | 180 | CANCER |
| user6 (DUMMY) | - | - |
| user7 | 181 | HEART DISEASE |
| user8 | 183 | CANCER |
| user9 (DUMMY) | - | - |
| user10 | 184 | HEART DISEASE |
| user11 | 186 | CANCER |
| user12 | 188 | HEART DISEASE |

Fig.21

| ID | BODY HEIGHT | DISEASE |
|---|---|---|
| user1 | 172 | CANCER |
| user2 (DUMMY) | 173 | - |
| user4 | 175 | HEART DISEASE |
| user5 | 180 | CANCER |
| user6 (DUMMY) | 180 | - |
| user7 | 181 | HEART DISEASE |
| user8 | 183 | CANCER |
| user9 (DUMMY) | 183 | - |
| user10 | 184 | HEART DISEASE |
| user11 | 186 | CANCER |
| user3 (DUMMY) | 187 | - |
| user12 | 188 | HEART DISEASE |

Fig.23

| AGE | BODY HEIGHT | DISEASE |
|---|---|---|
| -30 | -170 | CANCER |
| -30 | -170 | CANCER |
| -30 | -170 | HEART DISEASE |
| 30- | -170 | HEART DISEASE |
| 30- | -170 | CANCER |
| 30- | -170 | CANCER |
| 30- | -170 | HEART DISEASE |
| 30- | 170- | CANCER |
| 30- | 170- | HEART DISEASE |
| 30- | 170- | HEART DISEASE |
| 30- | 170- | CANCER |
| 30- | 170- | HEART DISEASE |

Fig.24

| AGE | BODY HEIGHT | DISEASE |
|---|---|---|
| -30 | -170 | HEART DISEASE |
| -30 | -170 | CANCER |
| 30- | -170 | HEART DISEASE |
| 30- | -170 | CANCER |
| 30- | 170- | HEART DISEASE |
| 30- | 170- | HEART DISEASE |
| 30- | 170- | CANCER |

Fig.28

| ID | BODY HEIGHT | DISEASE |
|---|---|---|
| user1 | 160 | CANCER |
| user3 | 162 | HEART DISEASE |
| user5 | 165 | CANCER |
| user7 | 168 | HEART DISEASE |
| user8 | 172 | CANCER |
| user10 | 175 | HEART DISEASE |
| user11 | 178 | CANCER |
| user12 | 179 | HEART DISEASE |

Fig.29

| ID | AGE |
|---|---|
| user1 | 16 |
| user2 | 22 |
| user3 | 19 |
| user4 | 31 |
| user5 | 30 |
| user6 | 33 |
| user7 | 32 |
| user8 | 31 |
| user9 | 35 |
| user10 | 34 |
| user11 | 41 |
| user12 | 40 |

Fig.30

| AGE | BODY HEIGHT | DISEASE | ID |
|---|---|---|---|
| ? | any | CANCER:4, HEART DISEASE:4 | user1, 3,5,7,8,10,11,12 |

Fig.31

| AGE | BODY HEIGHT | DISEASE | ID |
|---|---|---|---|
| any | ? | ? | user1-12 |

Fig.32

| AGE | BODY HEIGHT | DISEASE | ID |
|---|---|---|---|
| ? | -170 | CANCER:2, HEART DISEASE:2 | user1, 3,5,7, |
| ? | 170- | CANCER:2, HEART DISEASE:2 | user8,10,11,12 |

Fig.33

| AGE | BODY HEIGHT | DISEASE | ID |
|---|---|---|---|
| any | ? | ? | user1, 3,5,7, |
| any | ? | ? | user8,10,11,12 |

Fig.34

| AGE | BODY HEIGHT | DISEASE | ID |
|---|---|---|---|
| -30 | ? | ? | user1, 3 |
| 30- | ? | ? | user5,7 |
| 30- | ? | ? | user8,10,11,12 |

Fig.35

| AGE | BODY HEIGHT | DISEASE | ID |
|---|---|---|---|
| ? | -170 | CANCER:1, HEART DISEASE:1 | user1, 3 |
| ? | -170 | CANCER:1, HEART DISEASE:1 | user5,7 |
| ? | 170- | CANCER:2, HEART DISEASE:2 | user8,10,11,12 |

Fig.36

| AGE | BODY HEIGHT | DISEASE | ID |
|---|---|---|---|
| -30 | ? | ? | user1, 3 |
| 30-40 | ? | ? | user5, 7 |
| 30-40 | ? | ? | user8, 10 |
| 40- | ? | ? | user11, 12 |

Fig.37

| AGE | BODY HEIGHT | DISEASE | ID |
|---|---|---|---|
| ? | -170 | CANCER:1, HEART DISEASE:1 | user1, 3 |
| ? | -170 | CANCER:1, HEART DISEASE:1 | user5, 7 |
| ? | 170- | CANCER:1, HEART DISEASE:1 | user8, 10 |
| ? | 170- | CANCER:1, HEART DISEASE:1 | user11, 12 |

Fig.38

| AGE | BODY HEIGHT | DISEASE |
|---|---|---|
| -30 | -170 | HEART DISEASE |
| -30 | -170 | CANCER |
| 30-40 | -170 | HEART DISEASE |
| 30-40 | -170 | CANCER |
| 30-40 | 170- | HEART DISEASE |
| 30-40 | 170- | CANCER |
| 40- | 170- | HEART DISEASE |
| 40- | 170- | CANCER |

US 9,405,787 B2

DISTRIBUTED ANONYMIZATION SYSTEM, DISTRIBUTED ANONYMIZATION DEVICE, AND DISTRIBUTED ANONYMIZATION METHOD

CROSS-REFERENCE TO RELATED APPLICATIONS

This application is a national stage application of International Application No. PCT/JP2012/064016 entitled "Distributed Anonymization System, Distributed Anonymization Device, and Distributed Anonymization Method," filed on May 24, 2012, which claims the benefit of the priority of Japanese patent application No. 2011-124398, filed on Jun. 2, 2011, the disclosures of each of which are hereby incorporated by reference in their entirety.

TECHNICAL FIELD

The invention relates to an anonymization technology which is used when pieces of information which are distributed and stored are combined.

BACKGROUND ART

An anonymization (distributed anonymization) technology is known, that avoid identifications of individuals and estimations of attributes when pieces of information which are distributed and stored are combined.

The technology in a Non-Patent Document 1, for example, abstracts pieces of personal information which two business operators store and generates an initial anonymity table, when pieces of data are combined between the two business operators. The technology in the Non-Patent Document 1 gradually varies the abstracted pieces of personal information into detailed information while evaluating whether anonymity is satisfied or not.

In order to generalize the pieces of personal information, one of the business operators determines a candidate for a separating point of the pieces of personal information and informs the other business operator of a list of user identifiers separated at the separating point. When separating the pieces of data at the informed separating point, the business operator storing sensitive information confirms whether or not two indices, k-anonymity and i-diversity, are satisfied. Where, the sensitive information means information which is not intended to change in order to use for information processing of the combined pieces of data. An individual cannot be identified based on the pieces of data which satisfies the two indices.

By providing users with only the pieces of data which satisfy the two indices, identifications of individuals based on the provided pieces of data is avoidable. In other words, the technology in the Non-Patent Document 1 can avoid identifications of the individual sensitive information.

A Non-Patent Document 2 expresses a technology concerning Open ID.

Non-Patent Documents

[Non-Patent Document 1]
"Privacy-Preserving Data Mashup", Noman Mohammed, Benjamin C. M. Fung, Ke Wang, Patrick C. K. Hung, In EDBT '09 Proceedings of the 12th International Conference on Extending Database Technology: Advances in Database Technology, 2009.

[Non-Patent Document 2]
"Open ID Authentication 2.0—Final", Open ID Foundation, 2007, http://openid.net/specs/openid-authentication-2_0.html, http://openid-foundation-japan.github.com/openid-authentication.html

SUMMARY OF THE INVENTION

Problem to be Solved by the Invention

A problem of the technology of the Non-Patent Document 1 is that existence of user data is leaked to other business operator during distributed anonymization processing. For instance anonymization processing which is conducted when pieces of data stored in a business operator A and a business operator B are combined is explained. Suppose that the business operator A informs the business operator B of personal information (e.g. user ID) in the middle of the anonymization processing. In this case, 'data of the user having the informed user ID exists at least in the data stored by the business operator A' is leaked to the business operator B due to the information from the business operator A.

One of objects of the invention is to provide the distributed anonymization system, the distributed anonymization device, the distributed anonymization method, and program in which an existence of user data is not leaked to other business operator during the distributed anonymization processing.

Means for Solving a Problem

In order to achieve the object, the distributed anonymization system of the invention includes
an identifier managing device that manages identifiers of all users;
a first distributed anonymization device; and
a second distributed anonymization device, wherein
the identifier managing device informs the first distributed anonymization device and the second distributed anonymization device of the managing identifiers,
the first anonymization device comprises
first storing unit which stores a user identifier and information on a user in association with one another;
first separating unit which separates the user identifier stored in the first storing unit and a dummy identifier which is an identifier different from the user identifier, in all of the identifiers that are informed from the identifier informing unit, into first groups;
first transmitting unit which transmits to the second distributed anonymization device first information on the identifiers included in the separated first groups; and
first receiving unit which receives second information transmitted from the second distributed anonymization device and separating all the identifiers into first groups on the basis of the second information,
the second anonymization device comprises
second storing unit which stores a user identifier and information on a user in association with one another;
second separating unit which separates the user identifier stored in the second storing unit and a dummy identifier which is an identifier different from the user identifier, in all of the identifiers that are informed from the identifier informing unit, into second groups;
second transmitting unit which transmits to the first distributed anonymization device second information on the identifiers included in the separated second groups; and second receiving unit which receives the first information transmitted from the first distributed anonymization device and separating all the identifiers into second groups on the basis of the first information, at least one of the first distributed anonymization device and the second distributed anonymization device further comprises determining unit which determines, each of the first groups or each of the second groups, whether proportion of identifiers existing in both the first distributed anonymization device and the second distributed anonymization device satisfies a predetermined anonymity index; and generating unit which cancels the latest separation and generates a combination anonymization table if the determining unit determines the anonymity index is not satisfied.

In order to achieve the object, the distributed anonymization device of the invention includes storing unit which stores a user identifier and information on a user in association with one another;

separating unit which separates the stored user identifier and a dummy identifier which is an identifier different from the user identifier, in a plurality of inputted identifiers, into groups;

transmitting unit which transmits to another device information on the identifiers in the separated groups; and determining unit which determines, on each of the groups, whether or not proportion of identifiers existing in both the abovementioned distributed anonymization device and the other device satisfies a predetermined anonymity index.

In order to achieve the object, the distributed anonymization method, wherein a computer stores a user identifier and information on a user in association with one another, separates the stored user identifier and a dummy identifier which is an identifier different from the user identifier, in a plurality of inputted identifiers, into groups, transmits to another device, information on the identifiers in the separated groups, and determines, on each of the groups, whether or not proportion of identifiers existing in both the abovementioned distributed anonymization device and the other device satisfies a predetermined anonymity index.

Effect of the Invention

An example of effects of the invention is that distributed anonymization processing can be conducted without a risk that existence of user data leaks to other business operators.

BRIEF DESCRIPTION OF THE DRAWINGS

FIG. 5 is a diagram illustrating an example of a table including a dummy identifier reconfigured by a first setting unit 130, FIG. 6 is a diagram illustrating an example of a table in which a value of appropriate personal information is allocated to the dummy identifier, FIG. 7 is a diagram illustrating an example of an initial anonymity table stored by a business operator A in the first exemplary embodiment of the invention, FIG. 8 is a diagram illustrating an example of an initial anonymity table stored by a business operator B in the first exemplary embodiment of the invention, FIG. 9 is a diagram illustrating pieces of data in which the table of FIG. 7 is separated at the body height of '170', FIG. 10 is a diagram illustrating pieces of data in which the table of FIG. 8 is separated based on received separation information, FIG. 11 is a diagram illustrating pieces of data in which the table of FIG. 10 is separated at the age of '30', FIG. 12 is a diagram illustrating pieces of data in which the table of FIG. 9 is separated based on received separation information, FIG. 13 is a diagram illustrating pieces of data in which the table of FIG. 11 is separated at the age of '40', FIG. 14 is a diagram illustrating pieces of data in which the table of FIG. 12 is separated based on received separation information, FIG. 15 is a diagram illustrating a table in which the number of persons existing in both is calculated, FIG. 16 is a diagram illustrating a final combined anonymization table generated based on the first exemplary embodiment of the invention, FIG. 18 is a diagram illustrating a table in which a first operating unit 140 of the first exemplary embodiment associates a value of appropriate personal information with the dummy identifier, FIG. 19 is a diagram illustrating a table in which a first operating unit 145 of the second exemplary embodiment associates the dummy identifier with values in a certain range, as values of pieces of personal information, FIG. 20 is a diagram illustrating a table in which the first setting unit 130 of the first exemplary embodiment sets the dummy identifier, FIG. 21 is a diagram illustrating a table in which a first operating unit 145 of a third exemplary embodiment associates values of the dummy identifiers based on distribution of values of the user identifiers, FIG. 23 is a diagram illustrating an example of a combination anonymization table which a first generating unit 195 generates by holding all the dummy identifiers, FIG. 24 is a diagram illustrating an example of a combination anonymization table which the first generating unit 195 generates by deleting one user identifier, FIG. 28 is a diagram illustrating an example of a table of personal information stored in a device of the business operator A, FIG. 29 is a diagram illustrating an example of a table of personal information stored in a device of the business operator B, FIG. 30 is a diagram illustrating an example of an initial anonymity table of personal information stored in the device of the business operator A, FIG. 31 is a diagram illustrating an example of an initial anonymity table of personal information stored in the device of the business operator B, FIG. 32 is a diagram illustrating a table in which the table of FIG. 30 is separated at the body height of '170', FIG. 33 is a diagram illustrating pieces of data in which the table of FIG. 31 is separated based on received separation information, FIG. 34 is a diagram illustrating pieces of data in which the table of FIG. 33 is separated at the age of '30', FIG. 35 is a diagram illustrating pieces of data in which the table of FIG. 32 is separated based on received separation information, FIG. 36 is a diagram illustrating pieces of data in which the table of FIG. 34 is separated at the age of '40', FIG. 37 is a diagram illustrating pieces of data in which the table of FIG. 35 is separated based on received separation information, FIG. 38 is a diagram illustrating a finally combined anonymization table.

EXEMPLARY EMBODIMENTS FOR CARRYING OUT OF THE INVENTION

First Exemplary Embodiment

Figure 1:
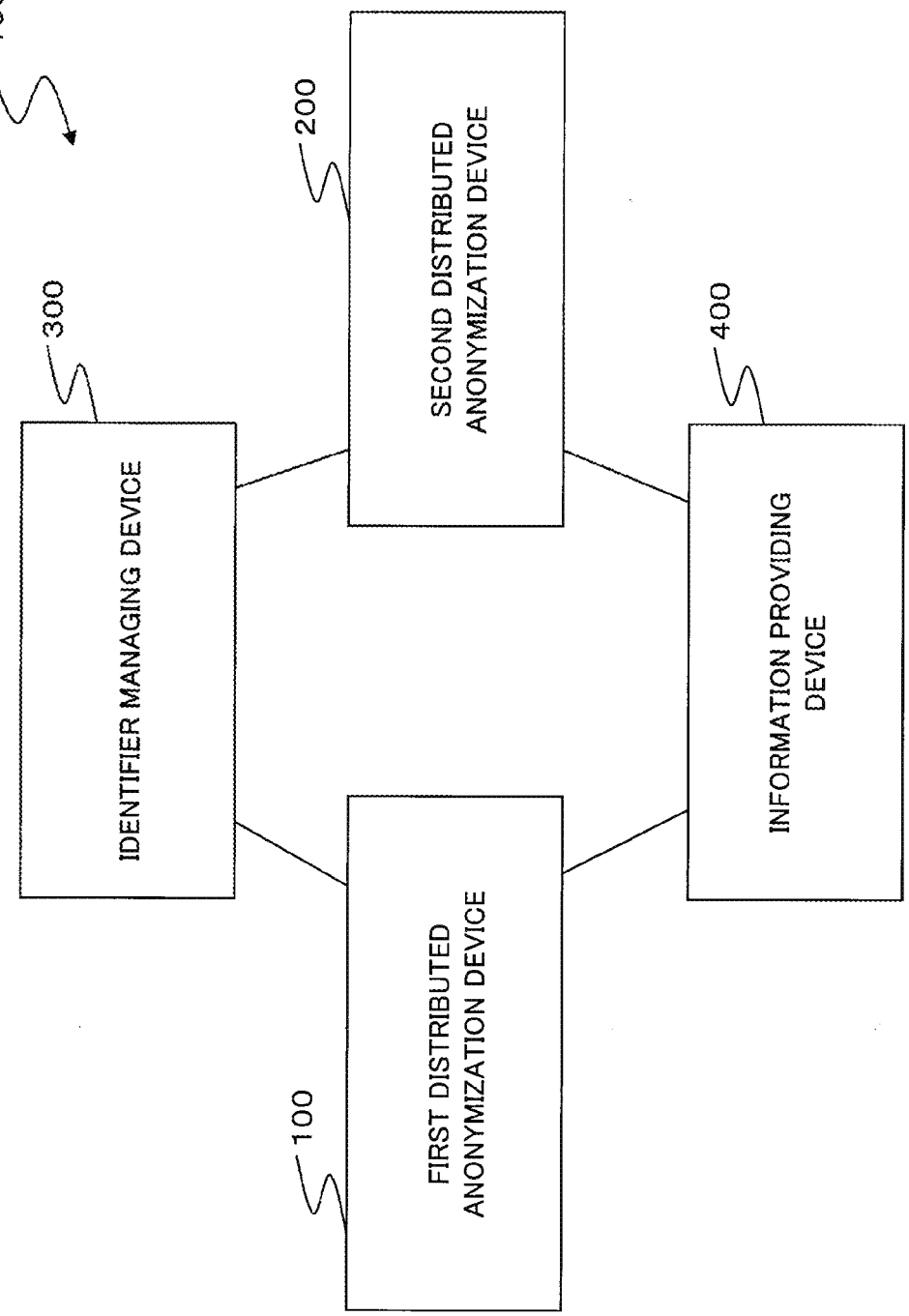
FIG. 1 is a block diagram illustrating a configuration of a distributed anonymization system 1000 of a first exemplary embodiment.

A background of the invention is described in order to make it easy to understand exemplary embodiments of the invention.

A case is described, in which one or some pieces of personal information stored by each of different business operators, a business operator A and a business operator B, are combined while keeping anonymity and diversity.

For instance, suppose that the business operator A is a hospital and stores pieces of personal information on a body height and a disease. Suppose that the business operator B is a sport center and stores pieces of personal information on an age. The pieces of personal information stored in each of the business operators correspond to common identifiers managed by an identifier managing business operator.

In this example, suppose that the pieces of personal information on a disease are sensitive information. The pieces of personal information except the sensitive information are called quasi-identifiers. Alternatively, information which is not noticeable from appearance and which anyone does not want the other person to know (information on a disease) may be the sensitive information. And information which can be presumed to some extent from appearance (e.g. body height, age) may be separated as quasi-identifiers.

The technology of Non-Patent Document 1 is employed as the distributed anonymization technology. Whether or not anonymity and diversity is maintained is determined based on whether or not predetermined indices of k-anonymity and i-diversity are satisfied. The k-anonymity is the index which requires that combination of quasi-identifiers makes the same k or more users. The l-diversity is the index which requires that combination of quasi-identifiers makes 1 or greater pieces of sensitive information of the same user. In following descriptions on the example, it is required that a table of personal information satisfies 2-anonymity and 2-diversity.

The identifier managing business operator notifies each of business operators of user identifiers for combination targets. For example, suppose that identifiers, user 1 to user 12, are informed to each of the business operators.

A device of the business operator A stores a table of personal information shown in FIG. 28 with respect to users of the informed identifiers. As shown in FIG. 28, the device of the business unit A stores pieces of personal information on users of eight identifiers, a user 1, user 3, user 5, user 7, user 8, user 10, user 11, and user 12.

A device of the business operator B stores a table of personal information shown in FIG. 29 with respect to users of the informed identifiers. As shown in FIG. 29, the device of the business unit B stores pieces of personal information on all the users (users of identifiers of user 1 to user 12) of the informed identifiers.

The technology of Non-Patent Document 1 generates an initial anonymity table in which each pieces of personal information is abstracted. The technology of Non-Patent Document 1 generates an initial anonymity table shown in FIG. 30 from the table of FIG. 28 stored in the device of the business operator A. The technology of Non-Patent Document 1 generates an initial anonymity table shown in FIG. 31 from a table of FIG. 29 stored in the device of the business operator B.

The technology of Non-Patent Document 1 gradually varies personal information in the tables into detailed information from the abstracted tables as shown in FIG. 30 and FIG. 31, while evaluating whether anonymity and diversity are satisfied or not.

The device of the business operator A determines a safe separating point of pieces of personal information by which the pieces of personal information is not specified. The device of the business operator A determines an average value of body heights which are quasi-identifiers, as the separating point. Specifically, the device of the business operator A chooses the body height of '170', as the separating point.

FIG. 32 is a diagram representing pieces of data in which the table of FIG. 30 is separated at the body height of '170'. As shown in FIG. 32, if the body height of '170' is the separating point, users (the identifiers) are separated into {user 1, user 3, user 5, user 7} and {user 8, user 10, user 11, user 12}. The device of the business operator A transmits to the business operator B separation information (information representing that users (identifiers) are separated into two groups, {users 1, 3, 5, 7} and {users 8, 10, 11, 12}). The separation information may be a list of the user identifiers separated at the separating point.

At this time, the business operator B notices what user's data exists in the data stored in the business operator A, based on the transmitted separation information on users (identifiers). Specifically, the business B notices that the data stored in the business operator A includes the data on eight users which corresponds to identifiers, user 1, user 3, user 5, user 7, user 8, user 10, user 11, and user 12.

This problem is a problem mentioned above 'existence of user data is leaked to other business operator during distributed anonymization processing' (problem 1). The distributed anonymization system of the exemplary embodiment solves a problem that existence of user data is leaked from combined data described below, in addition to the problem 1.

The device of the business operator B receives the separation information from the device of the business operator A. The device of the business operator B separates the initial anonymity table shown in FIG. 31 based on the separation information. FIG. 33 is a diagram illustrating data in which the table in FIG. 31 is separated based on the received separation information.

The device of the business operator A checks whether or not anonymity and diversity of the table in FIG. 32 are maintained. The group in which the body height is 170 or less in FIG. 32 (first line group) lies in 4-anonymity and 2-diversity and therefore maintains the anonymity and the diversity.

Specifically, the anonymity is 4-anonymity since four users having the same combination of quasi-identifiers (body height and age) exist. The diversity is 2-diversity since pieces of sensitive information (personal information on diseases) of the user having the same combination of quasi-identifiers are two kinds of diseases, i.e. cancer and heart disease.

The group in which the body height is 170 or greater in FIG. 32 (second line group) lies in 4-anonymity and 2-diversity and therefore maintains the anonymity and the diversity.

In the example, since only the business operator A stores the sensitive information, only the business operator A has to check anonymity and diversity.

When the business operator A confirms 'anonymity and diversity of the table stored in the business operator A are maintained', the device of the business operator B determines a next separating point. The device of the business operator B, here, chooses an average value of ages which are quasi-identifiers, as the separating point. Specifically, the device of the business operator B chooses the age '30', as the separating point.

FIG. 34 is a diagram representing pieces of data in which the table of FIG. 33 is separated at the age '30'. As shown in FIG. 34, when the age '30' is the separating point, users (identifiers) are separated into {user 1, user 3}, {user 5, user 7} and {user 8, user 10, user 11, user 12}. The device of the business operator B transmits the separation information of the users (identifiers) (information representing that the users (identifiers) are separated into three groups, {user 1, 3}, {user 5, 7} and {user 8, 10, 11, 12}), to the business operator A.

When receiving the separation information from the device of the business operator B, the device of the business operator A separates the table of FIG. 32 based on the separation information. FIG. 35 is a diagram illustrating pieces of data in which the table of FIG. 32 are separated based on the received separation information.

Next, the device of the business operator A checks whether or not anonymity and diversity in the table of FIG. 35 are maintained. Regarding the anonymity, 2-anonymity, 2-anonymity, and 4-anonymity in order from top line are included, and therefore the index of 2-anonymity is maintained. Since any diversity is 2-diversity, the index of diversity is maintained.

Next, suppose that the device of the business operator A determines an appropriate separating point does not exist. In this case, the device of the business operator A informs the business operator B that the separating point does not exist. When receiving from the business operator A that the separating point does not exist, the device of the business operator B chooses an appropriate point. The device of the business operator B chooses, for example, the age '40', as the separating point.

FIG. 36 is a diagram illustrating data in which the table in FIG. 34 is separated at the age '40'. As shown in FIG. 36, when the age '40' is the separating point, users (identifiers) are separated into {user 1, user 3}, {user 5, user 7}, {user 8, user 10}, and {user 11, user 12}. The device of the business operator B transmits, to the business operator A, the separation information of the users (identifiers) (information representing that the users (identifiers) are separated into four groups, {user 1, 3}, {user 5, 7}, {user 8, 10}, and {user 11, 12}).

When receiving the separation information from the device of the business operator B, the device of the business operator A separates the table of FIG. 35 based on the separation information. FIG. 37 is a diagram illustrating pieces of data in which the table of FIG. 35 are separated based on the received separation information.

Next, the device of the business operator A checks whether or not anonymity and diversity in the table of FIG. 37 are maintained. Since any line includes 2-anonymity and 2-diversity, indices of anonymity and diversity are satisfied.

Since it is obvious that anonymity and diversity are not satisfied if further separation is conducted, the business operator A and the business operator B complete data separation, output respective separated pieces of data, and combine the pieces of data.

FIG. 38 is a diagram illustrating a final combined anonymization table. As shown in FIG. 38, indices of anonymity and diversity are maintained in each of groups of combination of quasi-identifiers. Therefore, it is not possible to identify personal sensitive information. Specifically, even if seeing FIG. 38, the business operator B cannot notice what kind of disease a user suffers from.

However, the business operator B understands that two users at age 40 or over whose identifiers are user 11 and user 12 exist, from self-owned data. The business operator B therefore understands that data on at least two users whose identifiers are user 11 and user 12 exists in data stored by the business operator A.

That is, in addition to the problem 1 described above, a problem (problem 2) in which 'from final combined anonymization table, existence of user data is leaked to other business operator' exists.

The problem 1 and the problem 2 mean for example that 'though specific disease is not identified, a user goes to hospital due to a cancer or a heart disease', is leaked.

In the first exemplary embodiment described below, the problem 1 and the problem 2 explained above are solved.

Figure 2:
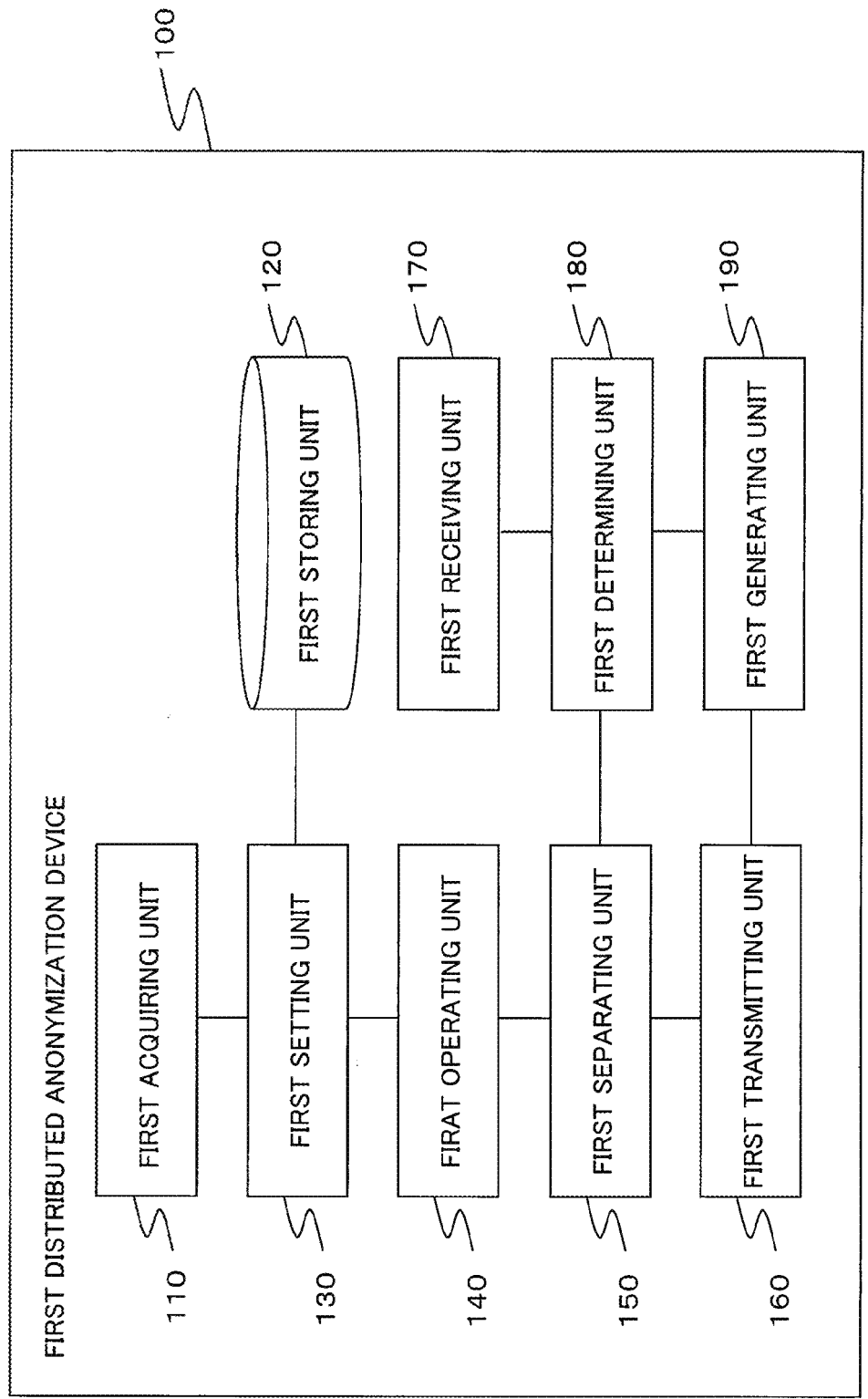
FIG. 2 is a block diagram illustrating a configuration of a first distributed anonymization device 100.
Figure 3:
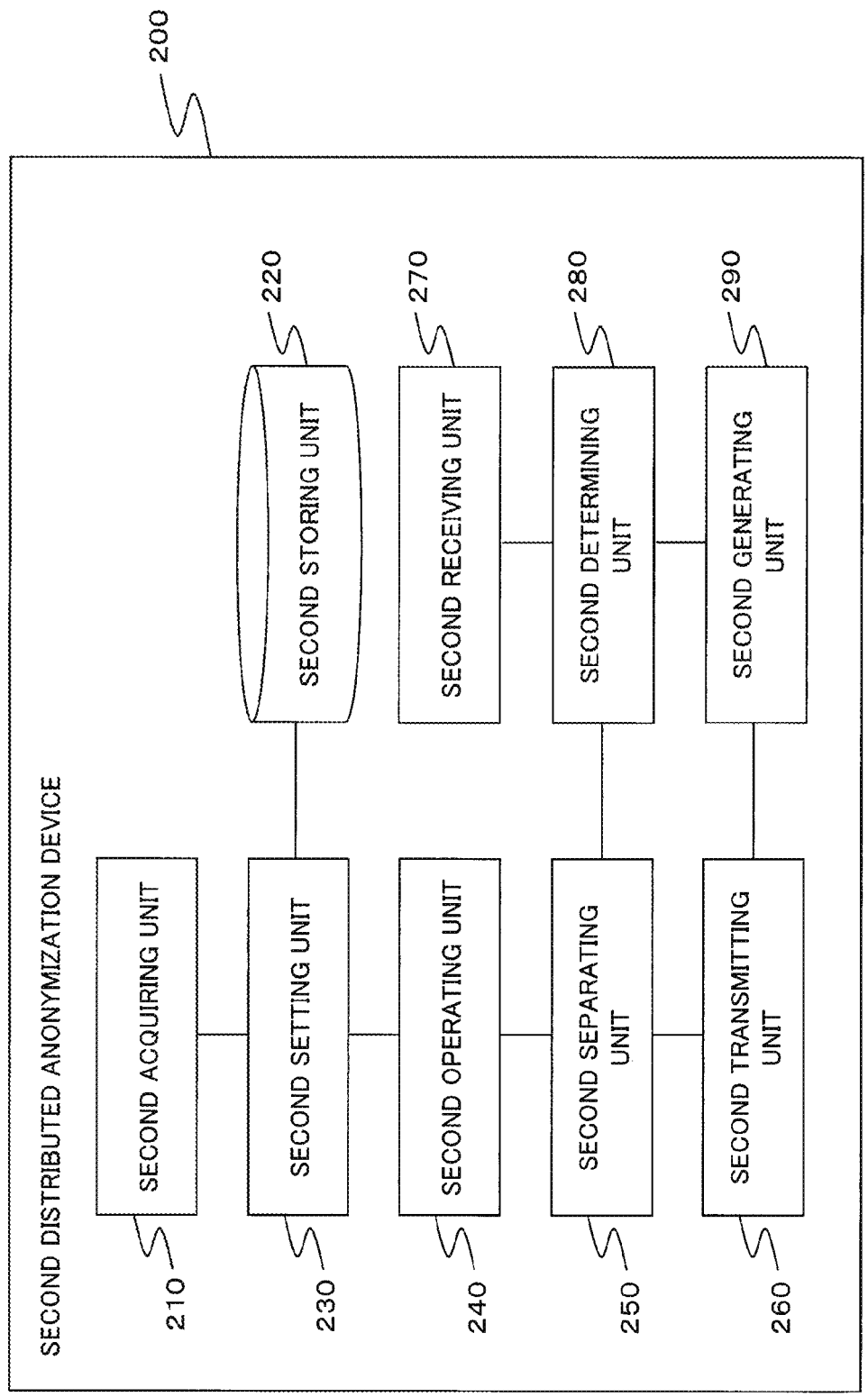
FIG. 3 is a block diagram illustrating a configuration of a second distributed anonymization device 200.

Referring to FIGS. 1 to 3, a functional configuration of a distributed anonymization system 1000 of the first exemplary embodiment of the invention is described.

FIG. 1 is a block diagram illustrating a configuration of the distributed anonymization system 1000 of the first exemplary embodiment. As shown in FIG. 1, the distributed anonymization system 1000 includes a first distributed anonymization device 100, a second distributed anonymization device 200, an identifier managing device 300, and an information providing device 400. Two distributed anonymization devices are explained in the exemplary embodiment. However a system including the more than two devices is possible.

The first distributed anonymization device 100 is the device which the business operator A above described includes in order to conduct distributed anonymization processing.

The second distributed anonymization device 200 is the device which the business operator B above described includes in order to conduct distributed anonymization processing. The second distributed anonymization device 200 repeats separation of a table of personal information in cooperation with the first distributed anonymization device 100.

The identifier managing device 300 manages an identifier mutually used by the first distributed anonymization device 100 and the second distributed anonymization device 200. The identifier managing device 300 manages identifiers of all users which exist in at least one of the first distributed anonymization device 100 and the second distributed anonymization device 200.

The identifier managing device 300 informs the first distributed anonymization device 100 and the second distributed anonymization device 200 of all the managing identifiers. The identifier managing device 300 may inform, not all the managing identifiers, but all of identifiers identified as a target for processing of the distributed anonymization system 1000.

The identifier managed by the identifier managing device 300 may be a public ID. The identifier managed by the identifier managing device 300 may be an Open ID described in Non-Patent Document 2, and is not limited thereto.

The first distributed anonymization device 100 and the second distributed anonymization device 200 may preliminarily store data on all the identifiers. For example, the first distributed anonymization device 100 and the second distributed anonymization device 200 may store the public ID of a user which is allowed to register in the first distributed anonymization device 100 and the second distributed anonymization device 200.

FIG. 2 is a block diagram illustrating a configuration of the first distributed anonymization device 100. As shown in FIG. 2, the first distributed anonymization device 100 includes a first acquiring unit 110, a first storing unit 120, a first setting unit 130, a first operating unit 140, a first separating unit 150, a first transmitting unit 160, a first receiving unit 170, a first determining unit 180, and a first generating unit 190.

The first acquiring unit 110 receives information from the identifier managing device 300 and acquires all the identifiers which are population. The first acquiring unit 110 outputs data of all the acquired identifiers to the first setting unit 130.

The first storing unit 120 stores an user identifier and personal information in association with one another. When a certain device is focused on, the 'user identifier' means a user identifier actually stored by the device. For example, 'the user identifier which the first storing unit 120 stores' means the identifier which the first storing unit 120 stores. That is, 'the user identifier which the first storing unit 120 stores' excludes the user identifier which the first storing unit 120 does not store, but a second storing unit 220 described below stores.

The first setting unit 130 sets, as a dummy identifier, an identifier which does not correspond to the user identifier which the first storing unit 120 stores from among all the identifiers which are a plurality of identifiers informed from the first acquiring unit 110. The first setting unit 130 may add a dummy frag to the identifier which is set as the dummy identifier. The first setting unit 130 outputs data in which the dummy identifier is set, to the first operating unit 140. The second distributed anonymization device 200 cannot identify what identifier is the dummy identifier set by the first setting 130, from among all the identifiers.

The first operating unit 140 generates a table which lies in a state of start of separation (hereinafter, referred to as "initial anonymity table") from the data outputted from the first setting unit 130. The first operating unit 140 may associate the dummy identifier with a value of an appropriate personal information (a value of quasi-identifier and a value of sensitive information) before the initial anonymity table is generated. The first operating unit 140 outputs pieces of data of the initial anonymity table to the first separating unit 150.

The first separating unit 150 separates the data of all the identifiers included in the initial anonymity table outputted from the first operating unit 140, into groups. A separating method is not limited to the specific one. The first separating unit 150 may separate the data into two groups by using, as the separating point, an average value of values of predetermined quasi-identifiers. The first separating unit 150 may determine the separating point by using the well-known heuristic function.

The first separating unit 150 may determine the separating point in consideration of an amount of information entropy of the dummy identifier, in addition to the well-known heuristic function. By considering the amount of information entropy of the dummy identifiers, the first separating unit 150 determines the separating point so that the dummy identifier is appropriately distributed and arranged in the data after separation.

For instance the amount of information entropy of the dummy identifiers is calculated using the following equation, $p=$'the number of the dummy identifiers in a group after separation'/'the number of the identifiers in the group after separation (total of the number of the user identifiers and the number of the dummy identifiers)', the amount of information entropy of the dummy identifiers$=-1 \times p \times \log(p)$.

The first separating unit 150 calculates the amount of information entropy of the dummy identifier with respect to two groups which is generated after separation (two groups of equal to or greater than the separating point, and less than the separating point). Suppose that the sum of the amounts of information entropy of the two groups is S. If separation is carried out so that the dummy identifiers are included in the two groups after separation in the same proportion, the value of S is maximized.

If the separating point is determined by adding the value of S to the well-known heuristic function, the separating point is chosen, by which the dummy identifiers are appropriately distributed and arranged into data of the groups after separation. By determining the separating point in consideration of the value of S, the first separating unit 150 can increase the number of separations.

As described above, the first distributed anonymization device 100 and the second distributed anonymization device 200 do not understand dummy data in the other device each other. Specifically, the first distributed anonymization device 100 recognizes which identifier in data stored in the device 100 is a dummy. However, the device 100 cannot recognize which identifier the second distributed anonymization device 200 sets as a dummy.

The first separating unit 150 may calculate, by using MPC (Multi Party Computation) or SMPC (Secure Multi Party Computation), a value of the separating point in consideration of information on the dummy identifiers stored in the second distributed anonymization device 200. The first separating unit 150 can calculate, by using MPC or the like, a value of the separating point, even though the first distributed anonymization device 100 and the second distributed anonymization device 200 do not provide their personal information.

Determining the separating point in consideration of respective pieces of data stored by the first distributed anonymization device 100 and the second distributed anonymization device 200, the first separating unit 150 may calculate the value of the separating point by using MPC or SMPC. The case in which the first separating unit 150 uses MPC or SMPC is the case in which the optimum separating point is determined in consideration of values of body heights stored by the first distributed anonymization device 100 and values of ages stored by the second distributed anonymization device 200.

For convenience of descriptions, suppose that the first separating unit 150 separates pieces of data by using, as the separating point, the average value of values of quasi-identifiers.

The first separating unit 150 outputs the pieces of data separated in groups to the first transmitting unit 160.

The first transmitting unit 160 transmits separation information which represents content of identifiers in each of groups into which the first separating unit 150 separates data of all the identifiers. The separation information may be, for example, a list of user identifiers which are separated at the separating point.

The first receiving unit 170 receives the separation information transmitted from a second transmitting unit 260. The first receiving unit 170 separates data of all the identifiers based on the received separation information. The first receiving unit 170 outputs the data after separation to the first determining unit 180.

The first determining unit 180 determines whether or not proportion of identifiers existing in both the first distributed anonymization device 100 and the second distributed anonymization device 200 satisfies a predetermined anonymity index, for each group after separation. The anonymity index may be k-anonymity and i-diversity above-mentioned.

The first determining unit 180 determines whether or not existence index which is a ratio of the number of user identifiers to all the identifiers included in groups after separation is satisfied, for each group after separation.

The existence index is an index which is used in order to solve the problem 'existence of user data is leaked from a final combined anonymity table to the other business operator'. The existence index represents a user existence rate which means how many actual users exist in the total number of people including dummies. Specifically, the existence index is represented as
$a/(a+b)$, where a is the number of user identifiers actually existing in separated groups, and b is the number of dummy identifiers.

If a group after separation includes no dummy (b=0), the existence index is equal to one. The existence index which is equal to one means that by comparing data after separation with data stored in the first distributed anonymization device 100, it can be understood (recognized) that data of a user exists in data stored in the second distributed anonymization device 200. Further the existence index which is equal to one means that by comparing data after separation with data stored in the second distributed anonymization device 200, it can be understood (recognized) that data of a user exists in data stored in the first distributed anonymization device 100.

If a value of the existence index is less than one, the above described problem 'existence of user data is leaked from the final combined anonymization table to other business operators' does not occurs. An appropriate value may be arbitrarily set, as a threshold value of the existence index. For convenience of explanation, the value of the existence index may be less than one, specifically the threshold value of the existence index is set as 0.9999 . . . .

If the data after separation includes dummy identifiers which are different from each other, the first distributed anonymization device 100 and the second distributed anonymization device 200 do not find a really existing user identifier. Therefore, the first determining unit 180 cannot calculate a correct existence index. In this case, the first determining unit 180 may calculate whether or not the existence index is satisfied by using the above mentioned MPC or the like. If data in only one device includes a dummy identifier, the calculation by using MPC is not necessarily required.

Determining one of the anonymity index and the existence index is not satisfied, the first determining unit 180 outputs data to the first generating unit 190.

When the first determining unit 180 outputs the data, the first generating unit 190 cancels the latest separation which is performed with respect to the data, and reconfigures to the state in which the anonymity index and the existence index are satisfied. Then the first transmitting unit 160 transmits, to the second distributed anonymization device 200, information informing that the latest separation is canceled. When a second receiving unit 270 receives the information, the latest separation is canceled in the second distributed anonymization device 200.

The first generating unit 190 generates the final combined anonymization table (hereinafter referred to as 'combination anonymization table') from two tables in which the latest separation is canceled in both the first distributed anonymization device 100 and the second distributed anonymization device 200.

The first generating unit 190 outputs the generated combination anonymization table to the information providing device 400.

The information providing device 400 provides an information user with the combination anonymization table outputted from the first generating unit 190.

FIG. 3 is a block diagram illustrating a configuration of the second distributed anonymization device 200. As shown in FIG. 3, the configuration of the second distributed anonymization device 200 may be the same as that of the first distributed anonymization device 100.

Figure 4:
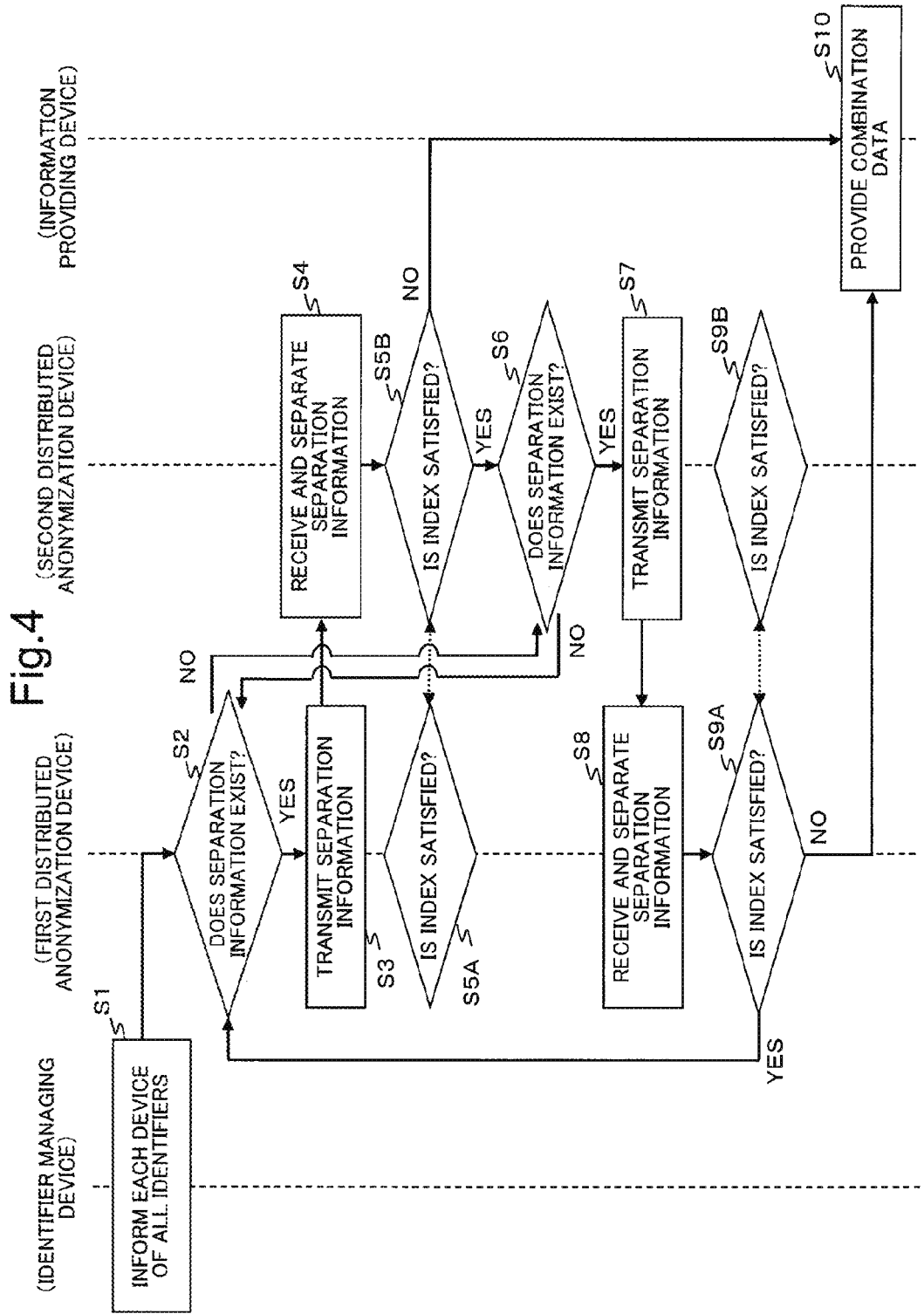
FIG. 4 is a flowchart illustrating operations of the distributed anonymization system 1000 of the first exemplary embodiment of the invention.

Referring to FIG. 4, an operation of the distributed anonymization system 1000 of the first exemplary embodiment of the invention is described.

FIG. 4 is a flowchart illustrating the operation of the distributed anonymization system 1000 of the first exemplary embodiment of the invention. As shown in FIG. 4, the identifier managing device 300 informs the first distributed anonymization device 100 and the second distributed anonymization device 200 of all managing identifiers (step S1).

In the first distributed anonymization device 100, when the first acquiring unit 110 receives information on all the identifiers, the first setting unit 130, sets an identifier actually stored in the first storing unit 120, as a user identifier, and sets the other identifiers, as dummy identifiers. In the second distributed anonymization device 200, the second acquiring unit 210 receives the information on all the identifiers and a second setting unit 230 also sets the dummy identifiers. Since the identifiers stored in the first storing unit 120 are different from the identifiers stored in the second storing unit 120, the user identifier and the dummy identifiers in the respective units are different.

The identifier managing device 300 may identify, not the all the managing identifiers, but identifiers which are targets for distributed anonymization processing, and inform of all the targeted identifiers.

Next the first operating unit 140 generates the initial anonymity table from data on all the identifiers. The first operating unit 140 may associate the dummy identifier with an appropriate value of personal information (quasi-identifier and a value of sensitive information), before generation of the initial anonymity table.

Next, the first separating unit 150 determines whether or not a candidate of a separating point to separate data of all the identifiers exists (step S2). Determining that the candidate of the separating point exists, the first separating unit 150 separates the data of all the identifiers at the separating point which is the candidate. The first separating unit 150 outputs data of the separated groups to the first transmitting unit 160.

Next, a process proceeds to step S3. If it is determined that the candidate of the separating point does not exist, a process proceeds to step S6.

In step S3, the first transmitting unit 160 transmits the separation information indicating content of the identifiers in each of the separated groups to the second distributed anonymization device 200.

Next, in the second distributed anonymization device 200, the second receiving unit 270 receives the separation information transmitted from the first transmitting unit 160. The second receiving unit 270 separates data of all the identifiers based on the received separation information (step S4).

Next, the first determining unit 180 and a second determining unit 280 determine whether or not the data after separation satisfies the anonymity index, a diversity index, and the existence index (step S5A, S5B). If sensitive information is stored in one device, it may be only the device which stores the sensitive information determine whether or not the anonymity index, the diversity index, and the existence index are satisfied.

Both of the first determining unit 180 and the second determining unit 280 (or one device storing the sensitive information) determine the indices are satisfied, the second separating unit 250 determines whether or not a candidate of an appropriate separating point which further separates data of all the identifiers exist (step S6).

When it is determined that the candidate of the separating point exists, processes proceed to steps S7 to 9A, 9B which are the same as steps S3 to 5A, 5B. When it is determined that the candidate of the separating point does not exists, a process proceeds to step S2. When it is determined that the candidate of the separating point does not exists, in both step S2 and step S6, a process proceeds to step S10.

When it is determined that indices are not satisfied, in step S5A, 5B, 9A or 9B, the first generating unit 190 and a second generating 290 cancel the latest separation and return their data to the state in which the latest indices are satisfied. Consequently the first generating unit 190 or the second generating 290 generates the combination anonymization table from the two tables in which the indices are satisfied. Next the first generating unit 190 or the second generating 290 outputs the generated combination anonymization table to the information providing device 400.

The information providing device 400 provides an information user with the combination anonymization table.

Next referring to FIG. 5 to FIG. 16, each step in FIG. 4 is specifically explained by using examples. It is supposed that the business operator A has the first distributed anonymization device 100, and the business operator B has the second distributed anonymization device 200. Further, it is supposed that an identifier managing business operator has the identifier managing device 300.

Examples described below suppose the same situation as the above described examples. Specifically the business operator A is a hospital, and stores personal information on a body height and a disease (table shown in FIG. 28). The business unit B is a sport center, and stores personal information on an age (table shown in FIG. 29). The personal information stored in each business operator corresponds to common identifiers managed by the identifier managing business operator. The personal information on a disease is the sensitive information, and it is required that the table of the personal information satisfies 2-anonymity and 2-diversity.

In the following examples, it is required that the table of the personal information satisfies the existence rate (existence index) of less than one, in addition to 2-anonymity and 2-diversity.

In step S1 in FIG. 4, the identifier managing business operator informs the business operator A and the business operator B of all the managing identifiers. The identifier managing business operator informs each business operator of identifiers of user 1 to user 12.

When the first acquiring unit 110 in the business operator A receives information on all the identifiers (user 1 to user 12), the first setting unit 130 compares with information shown in FIG. 28. As a result of the comparison, the first setting unit 130 sets the eight identifiers, user 1, user 3, user 5, user 7, user 8, user 10, user 11, and user 12, as the user identifiers. The first setting unit 130 sets the other identifiers, user 2, user 4, user 6, and user 9, as the dummy identifiers.

Since the second storing unit 220 in the business operator B stores all the identifiers (see FIG. 29), the second setting unit 230 sets all the identifiers as the user identifiers, and does not set the dummy identifiers.

The first setting unit 130 reconfigures the table as if a user who does not actually exist and corresponds to the dummy identifier exists.

FIG. 5 is a diagram illustrating an example of a table which includes the dummy identifier reconfigured by the first setting unit 130. FIG. 5 shows an example in which the identifiers and body heights are arranged in order of increasing. If values of the stored pieces of data are random (order of the body heights is random), the first setting unit 130 may rearrange the pieces of data and insert a dummy in an appropriate position.

The first operating unit 140 may associate an appropriate value of personal information (quasi-identifier and value of sensitive information) with the dummy identifier. FIG. 6 is a diagram illustrating an example of a table in which the appropriate value of personal information is allocated to the dummy identifier. The first distributed anonymization device 100 may exclude the first operating unit 140 and may perform following processes in the state of FIG. 5.

The first operating unit 140 and the second operating unit 240 generate the initial anonymity table in which each piece of personal information is abstracted. For example, the first operating unit 140 generates the initial anonymity table shown in FIG. 7 from the table of FIG. 5. The second operating unit 240 generates the initial anonymity table shown in FIG. 8 from the table of FIG. 29 stored by the business operator B.

As shown in FIG. 7 and FIG. 8, the initial anonymity table includes an identifier (ID), a quasi-identifier (information on age, body height), sensitive information (information on disease), and the number of dummies.

In step S2 in FIG. 4, the first separating unit 150 determines whether or not a safe separating point for personal information by which the personal information is not identified exists. Suppose that the first separating unit 150 determines that an average value of body heights which are quasi-identifiers is appropriate as the separating point. The first separating unit 150 determines the body height of '170' is the separating point.

FIG. 9 is a diagram representing pieces of data in which the table in FIG. 7 is separated at the body height '170'. As shown in FIG. 9, when the body height '170' is the separating point, users are separated to {user 1 to user 7} and {user 8 to user 12}.

In step S3 in FIG. 4, the first transmitting unit 160 transmits separation information on users (identifiers) (information representing that users (identifiers) are separated to two groups, {user 1 to user 7} and {user 8 to user 12}), to the business operator B.

When seeing the transmitted separation information on users (identifiers), the business operator B does not understand which user data exists in the data stored by the business operator A. That is because the business operator A transmits information on all the identifiers including a dummy. Since the dummy is included, the above mentioned problem (problem 1) 'existence of user data is leaked to the other business operators during distributed anonymization processing' is solved.

In step S4 in FIG. 4, the second receiving unit 270 of the business operator B receives the separation information from the business operator A, and separates the table of FIG. 8 based on the separation information. FIG. 10 is a diagram illustrating pieces of data in which the table of FIG. 8 is separated based on the received separation information.

In step S5A in FIG. 4, the first determining unit 180 confirms whether or not the anonymity and the diversity of the table in FIG. 9 are maintained. The group of the body heights of 170 and less in FIG. 9 (group of first line) includes three users out of seven users, as dummies, and therefore includes 4-anonymity. Further 2-diversity is included based on the table of FIG. 5. Therefore the anonymity and the diversity are maintained. The group of the body heights of 170 and greater in FIG. 9 (group of second line) includes 4-anonymity and 2-diversity and therefore maintains the anonymity and the diversity.

In the example, since only the business operator A stores the sensitive information, only the business operator A just has to confirm the anonymity and the diversity. In this case, step S5B in FIG. 4 is not performed.

In the example, since the dummy identifier is included in only the business operator A, it is not difficult to confirm that the index is satisfied. If the data of the business operator B includes the dummy identifier, the second determining unit 280 may confirm that both the data of the business operator A and the data of the business operator B satisfy the indices.

When it is confirmed that the table stored by the business operator A maintains the anonymity and the diversity, the second separating unit 250 of the business operator B determines whether or not a next appropriate separating point exists, in step S6 of FIG. 4. Here, suppose that the second separating unit 250 determines that an average value of ages which are quasi-identifiers is appropriate as the separating point. The second separating unit 250 chooses the age '30' as the separating point.

FIG. 11 is a diagram illustrating data in which the table of FIG. 10 is separated at the age '30'. As shown in FIG. 11, when the age '30' is the separating point, users are separated to {user 1 to user 3}, {user 4 to user 7}, and {user 8 to user 12}.

In step S7 of FIG. 4, the second transmitting unit 260 transmits to the business operator A the separation information on users (Information representing that users are separated into three groups, {user 1 to user 3}, {user 4 to user 7}, and {user 8 to user 12}).

In step S8 of FIG. 4, the first receiving unit 170 of the business operator A receives the separation information from the business operator B and separates the table of FIG. 9 based on the separation information. FIG. 12 is a diagram illustrating pieces of data in which the table of FIG. 9 is separated based on the received separation information.

In step S9A in FIG. 4, the first determining unit 180 confirms whether or not the table of FIG. 12 maintains the anonymity and the diversity. The anonymity is calculated by subtracting the number of dummy identifiers from the number of identifiers, and 2-anonymity, 2-anonymity, and 4-anonymity are obtained beginning at the top. The result satisfies the index of 2-anonymity. Since any diversity is 2-diversity according to the table of FIG. 5, the index of the diversity is satisfied.

Next, suppose that the first separating unit 150 determines that an appropriate separating point is not found, in step S2 in FIG. 4. In this case, the first transmitting unit 160 informs the business operator B that the separating point is not found.

When the second receiving unit 270 receives from the business operator A that the separating point is not found, the second separating unit 250 chooses an appropriate separating point in step S6 in FIG. 4. The second separating unit 250 chooses, for example, the age '40' as the separating point.

FIG. 13 is a diagram illustrating pieces of data in which the table of FIG. 11 is separated at the age '40'. As shown in FIG. 13, when the age '40' is the separating point, users are separated to {user 1 to user 3}, {user 4 to user 7}, {user 8 to user 10} and {user 11 to user 12}.

In step S7 of FIG. 4, the second transmitting unit 260 transmits to the business operator A the separation information on users (information representing that users are separated into four groups, {user 1 to user 3}, {user 4 to user 7}, {user 8 to user 10}, and {user 11 to user 12}).

In step S8 in FIG. 4, the first receiving unit 170 receives the separation information from the business operator B and separates the table of FIG. 12 based on the separation information. FIG. 14 is a diagram illustrating pieces of data in which the table of FIG. 12 is separated based on the received separation information.

In step S9A in FIG. 4, the first determining unit 180 confirms whether or not the table of FIG. 14 satisfies the anonymity index, the diversity index, and the existence index. The first determining unit 180 determines that since the number of dummies in the group of the fourth line in FIG. 14 is zero (b=0), and a/(a+b)=2/(2+0)=1, the existence index is not satisfied.

When the first determining unit 180 determines that the index is not satisfied, the first generating unit 190 cancels the latest separation from FIG. 12 to FIG. 14. The first transmitting unit 160 transmits information on the cancel to the business operator B. When receiving the information on the cancel, the second generating unit 290 cancels the latest separation from FIG. 11 to FIG. 13.

The first generating unit 190 or the second generating unit 290 calculates, with respect to each table which is canceled, the number of persons existing in both, by using MPC.

FIG. 15 is a diagram illustrating a table in which the number of persons existing in both is calculated.

The first generating unit 190 or the second generating unit 290 generates the combination anonymization table from the two canceled tables.

FIG. 16 is a diagram illustrating a final combined anonymization table (combination anonymization table) generated based on the first exemplary embodiment of the invention.

The combination anonymization table in FIG. 16 may be generated, not by the first generating unit 190 or the second generating unit 290, but by the information providing device 400 to which the tables are outputted from the both devices.

In step S10 in FIG. 4, the information providing device 400 provides an information user with the combination anonymization table (table shown in FIG. 16).

Referring to the table shown in FIG. 16 finally outputted, the business operator B does not understand which user data certainly exists in the data of the business operator A. Specifically, though understanding that pieces of data on two persons in three persons, user 1 to user 3, which are '-30', exist in the data of the business operator A, by referring to FIG. 16, the business operator B cannot identify the two persons. Further, though understanding that pieces of data on six persons in nine persons, user 4 to user 12, which are '30-', the data of the business operator A, by referring to FIG. 16, the business operator B cannot identify the six persons.

The first exemplary embodiment of the invention confirms that the existence index is satisfied in addition to the anonymity index and the diversity index. If the existence index is not satisfied, the distributed anonymization device of the first exemplary embodiment of the invention cancels the separation by which existence of a user can be identified, and solves the problem 2. The problem 2, here, is the problem in which 'existence of user data is leaked from the final combined anonymization table to the other business operators'.

As mentioned above, in the distributed anonymization system 1000 of the first exemplary embodiment, without a risk that existence of user data is leaked to the other business operators, the distributed anonymization processing can be performed. The reason is that in the distributed anonymization system 1000 of the first exemplary embodiment, data to be transmitted to other business operators includes dummy data which does not actually exist.

In the according to the distributed anonymization system 1000 of the first exemplary embodiment, it is possible to generate the combination anonymization table without the risk that existence of user data is leaked to the other business operators. The reason is that the distributed anonymization system 1000 of the first exemplary embodiment introduces a new index, i.e. the existence index, and generates a final table by cancelling separation by which existence of a user is identified when the existence index is not satisfied.

Second Exemplary Embodiment

Figure 17:
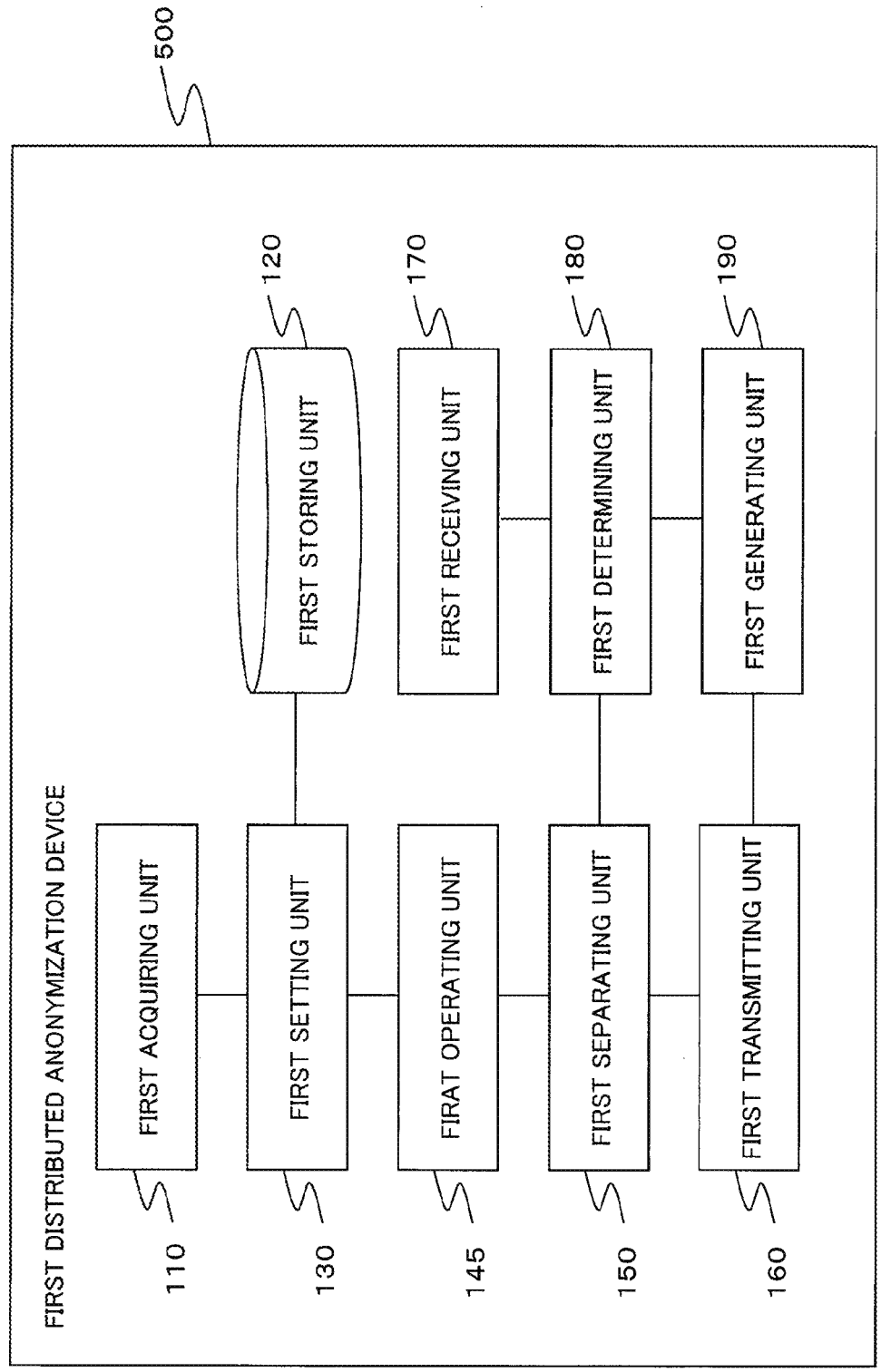
FIG. 17 is a block diagram illustrating a configuration of a first distributed anonymization device 500 of a second exemplary embodiment.

Referring to FIG. 17 to FIG. 19, a functional configuration of a first distributed anonymization device 500 of the second exemplary embodiment of the invention is explained.

FIG. 17 is a block diagram illustrating the configuration of the first distributed anonymization device 500 of the second exemplary embodiment. As shown in FIG. 17, the first distributed anonymization device 500 includes a first operating unit 145 instead of the first operating unit 140, compared with the first distributed anonymization device 100 of the first exemplary embodiment 100. Since the configuration except the first operating unit 145 is the same configuration as the first exemplary embodiment, the same reference numerals are added and explanations are omitted.

The first operating unit 145 associates a dummy identifier with values in a certain range, as values of pieces of personal information, in addition to the function in the first exemplary embodiment.

FIG. 18 and FIG. 19 are diagrams explaining a function of the first operating unit 145.

FIG. 18 is a diagram illustrating a table in which the first operating unit 140 of the first exemplary embodiment associates the dummy identifier with an appropriate value of the personal information. As shown in FIG. 18, a value of a body height of user 1 which is a user identifier is 155. A value of a body height of user 3 which is a user identifier is 162. For instance, the first operating unit 140 associates a value of 158, as a value of a body height, with user 2 which is the dummy identifier between two user identifiers.

FIG. 19 is a diagram illustrating a table in which the first operating unit 145 of the second exemplary embodiment associates the dummy identifier with values in a certain range, as values of pieces of personal information. As shown in FIG. 19, the first operating unit 145 associates user 2 of the dummy identifier with values in the range from 156 to 161, as values of body heights.

A case in which one value, as the dummy identifier, is determined is explained. When the separating point is set to the body height of '160', the first separating unit 150 certainly lets user 2 include the group of '-160'.

A case that values of the dummy identifiers in a certain range are set, like FIG. 19, is explained. Then, the first separating unit 150 can determine whether to let user 2 include the group of '-160' or let user 2 include the group of '160-' in the middle of protocol. The first separating unit 150 can appropriately separate a group without dummy bias.

As above description, in the first distributed anonymization device 500 of the second exemplary embodiment, it is possible to appropriately separate a group without dummy bias. The reason is that the first operating unit 145 associates the dummy identifier with values in a certain range, as values of pieces of personal information.

Third Exemplary Embodiment

Referring to FIG. 17, FIG. 20 and FIG. 21, a functional configuration of a first distributed anonymization device 500 of a third exemplary embodiment of the invention is explained.

The configuration of the first distributed anonymization device 500 of the third exemplary embodiment of the invention may be the same as the configuration of the first distributed anonymization device 500 of the second exemplary embodiment, and is shown in FIG. 17.

The first distributed anonymization device 500 of the third exemplary embodiment differs from the first distributed anonymization device 500 of the third exemplary embodiment in a method in which the first operating unit 145 associates a dummy identifier with a value of personal information.

The first operating unit 145 of the third exemplary embodiment may associate a value of a dummy identifier based on distribution of values of pieces of personal information on user identifiers.

FIG. 20 and FIG. 21 are diagrams explaining a function of the operating unit 145 of the third exemplary embodiment.

FIG. 20 is the diagram illustrating a table in which dummy identifiers is set by the first setting unit 130 of the first exemplary embodiment. As shown in FIG. 20, when the first operating unit 140 does not associate the dummy identifier with any value, an inserting position of the dummy identifier may be biased. In FIG. 20, two dummy identifiers exists in the group of body heights of 170s (group of user 1 to user 4) and therefore a user existence rate is 0.5. Two dummy identifiers exists in the group of body heights of 180s (group of user 5 to user 12) and therefore user existence rate is 0.25.

FIG. 21 is a diagram illustrating a table in which the first operating unit 145 of the third exemplary embodiment associates values of the dummy identifiers based on distribution of values of the user identifiers. As shown in FIG. 21, the first operating unit 145 associates the dummy identifier to values so that the user existence rate of the group of body heights of 170s is equal to the user existence rate of the group of body heights of 180s. In FIG. 21, one dummy identifier exists in the group of body heights of 170s (group of user 1, user 2, and user 4), and the user existence rate is 0.33 . . . . Three dummy identifiers exists in the group of body heights of 180s (group of user 5 to user 12, and user 3), and the user existence rate is 0.33 . . . .

The case in which position of the dummy identifiers is biased like FIG. 20, is described. At this time, the first separating unit 150 cannot set, for example, the body height of '185' as a separating point. That is because the existence index of the group of '185-' becomes one, if the body height of '185' is the separating point.

The case in which a value of the dummy identifier is determined based on distribution, like FIG. 21, is described. The first separating unit 150 can set the body height of '185', as a separating point. That is because the existence index of the group of '185-' becomes 0.66 . . . , and is satisfied.

As described above, in the first distributed anonymization device 500 of the third exemplary embodiment, it becomes possible to appropriately separate groups without dummy bias. The reason is that the first operating unit 145 associates a value of the dummy identifier based on distribution of values of pieces of personal information on the user identifiers.

Fourth Exemplary Embodiment

Figure 22:
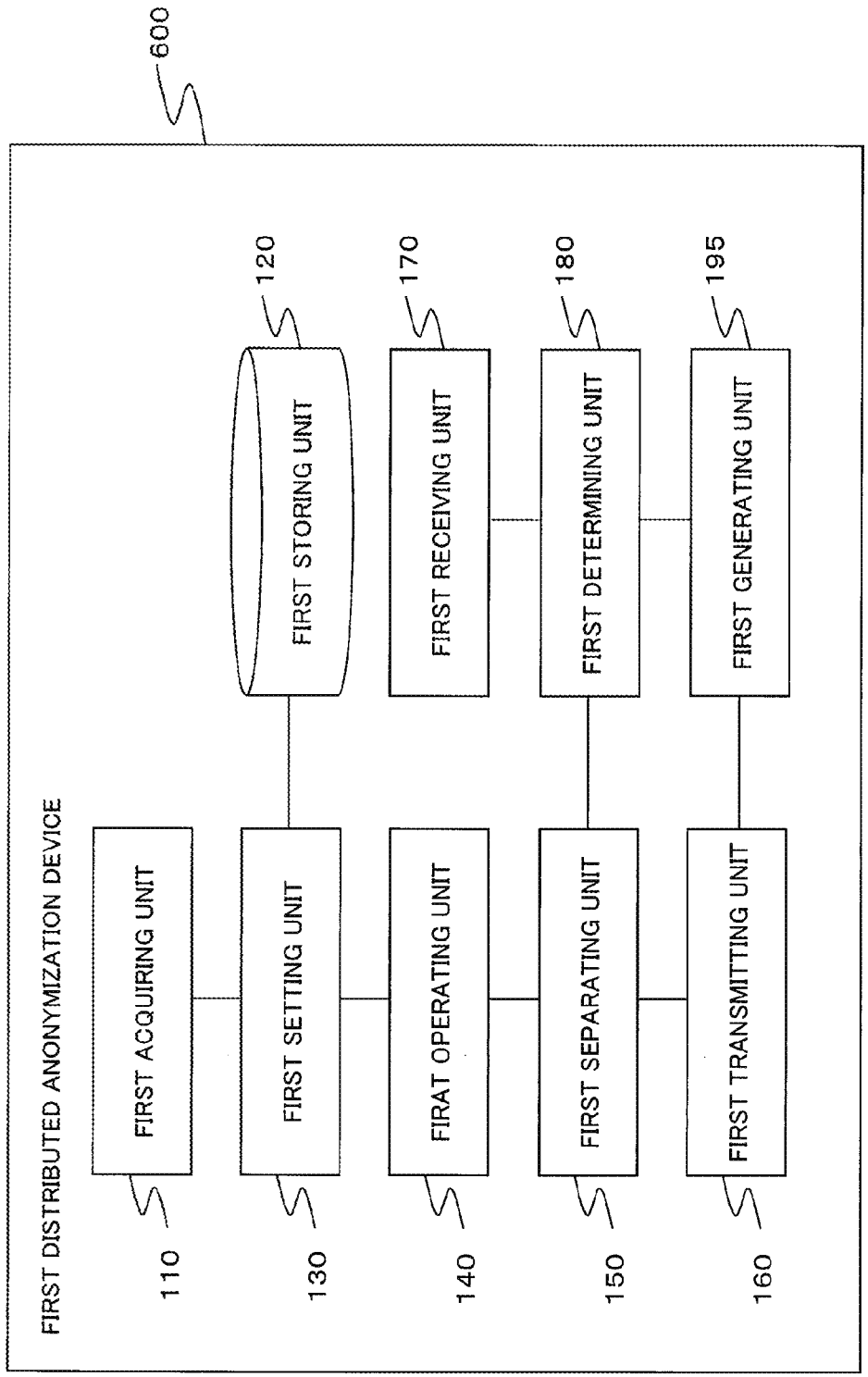
FIG. 22 is a block diagram illustrating a configuration of a first distributed anonymization device 600 of a fourth exemplary embodiment.

Referring to FIG. 22 to FIG. 24, a configuration of a first distributed anonymization device 600 of a fourth exemplary embodiment of the invention is explained.

FIG. 22 is a block diagram illustrating a configuration of the first distributed anonymization device 600 of the fourth exemplary embodiment. The first distributed anonymization device 600 differs from the first distributed anonymization device 100 of the first exemplary embodiment in that a first generating unit 195 is included instead of the first generating unit 190. Since the configuration except the first generating unit 195 is the same configuration as the first exemplary embodiment, the same reference numerals are added and the explanations are omitted.

The first generating unit 195 handles a case in which user identifiers stored by the two devices lie in an inclusion relation by changing a part of pieces of data of a final combined anonymization table. Specifically, even though the business operator B wholly includes all the user identifiers stored by the business operator A, the business operator A notices that all the user data stored by the business operator A exist in the data of the business operator B, by referring to the combination anonymization table. In such case, if the first generating unit 195 changes a part of the combination anonymization table, the business operator A does not notice existence of the user data stored by the business operator B.

For example, the first generating unit 195 may generate the combination anonymization table which leaves data on one or more dummy identifiers.

FIG. 23 is a diagram illustrating an example of a combination anonymization table which the first generating unit 195 generates by leaving all the dummy identifiers. As shown in FIG. 23, the first generating unit 195 leaves the dummy data, as final data. Since any data is potentially a dummy unlike FIG. 16, even though referring to the combination anonymization table of FIG. 23, the business operator A does not understand which user data exists in the data of the business operator B.

As another example, the first generating unit 195 may generate the combination anonymization table from which data on one or more dummy identifiers are deleted.

FIG. 24 is a diagram illustrating an example of the combination anonymization table which the first generating unit 195 generates by deleting one user identifier. As shown in FIG. 24, the first generating unit 195 deletes one user identifier which belongs to the group of 'age 30', body height '170-'. Even though referring to the combination anonymization table of FIG. 24, the business operator A does not understand whether or not all the user data exist in the data of the business operator B, unlike FIG. 16. Specifically, the business operator A does not understand which exists or does not exist, user 8 or user 11, in the business operator B.

As described above, the first distributed anonymization device 600 of the fourth exemplary embodiment can keep existence of the user data unclear and responds, even when user identifiers stored in two devices lie in the inclusion relation. The reason is that the first generating unit 195 changes a part of pieces of data in the final combined anonymization table.

Fifth Exemplary Embodiment

Figure 25:
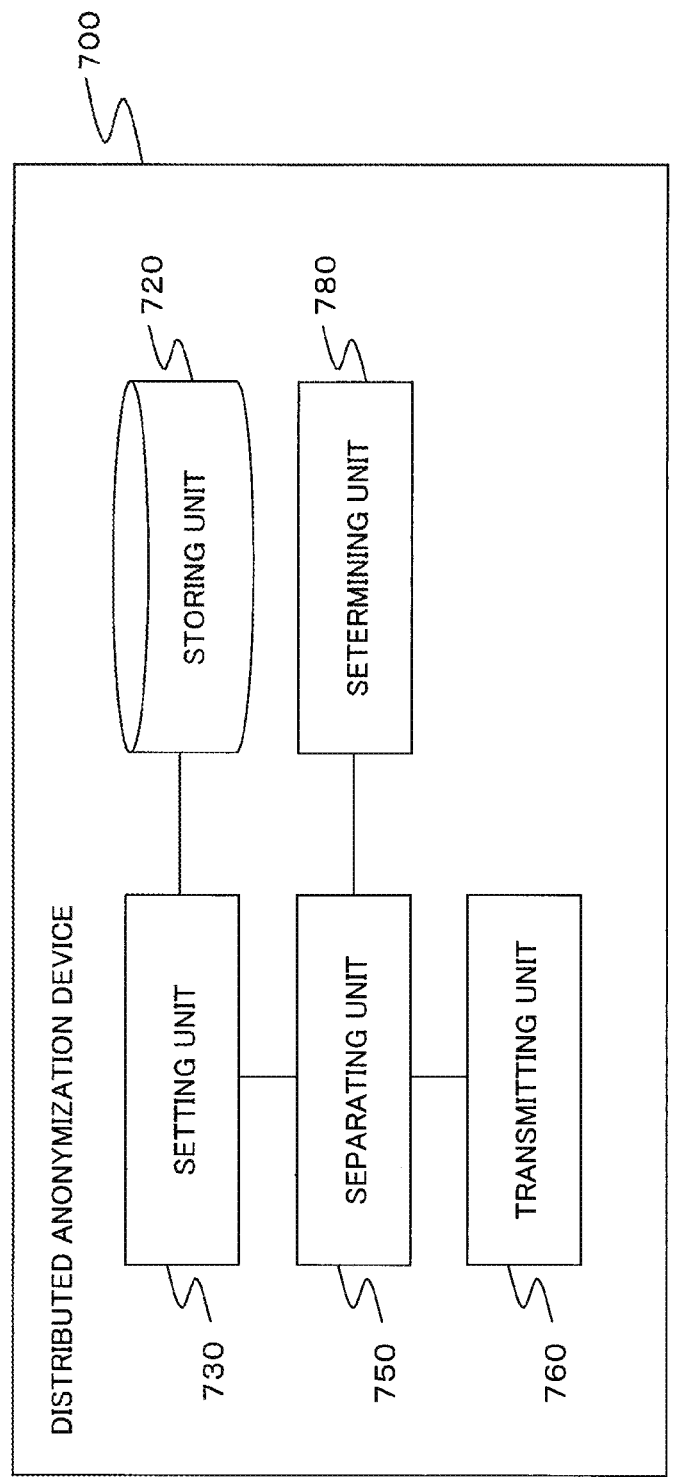
FIG. 25 is a block diagram illustrating a configuration of a distributed anonymization device 700 of a fifth exemplary embodiment.
Figure 26:
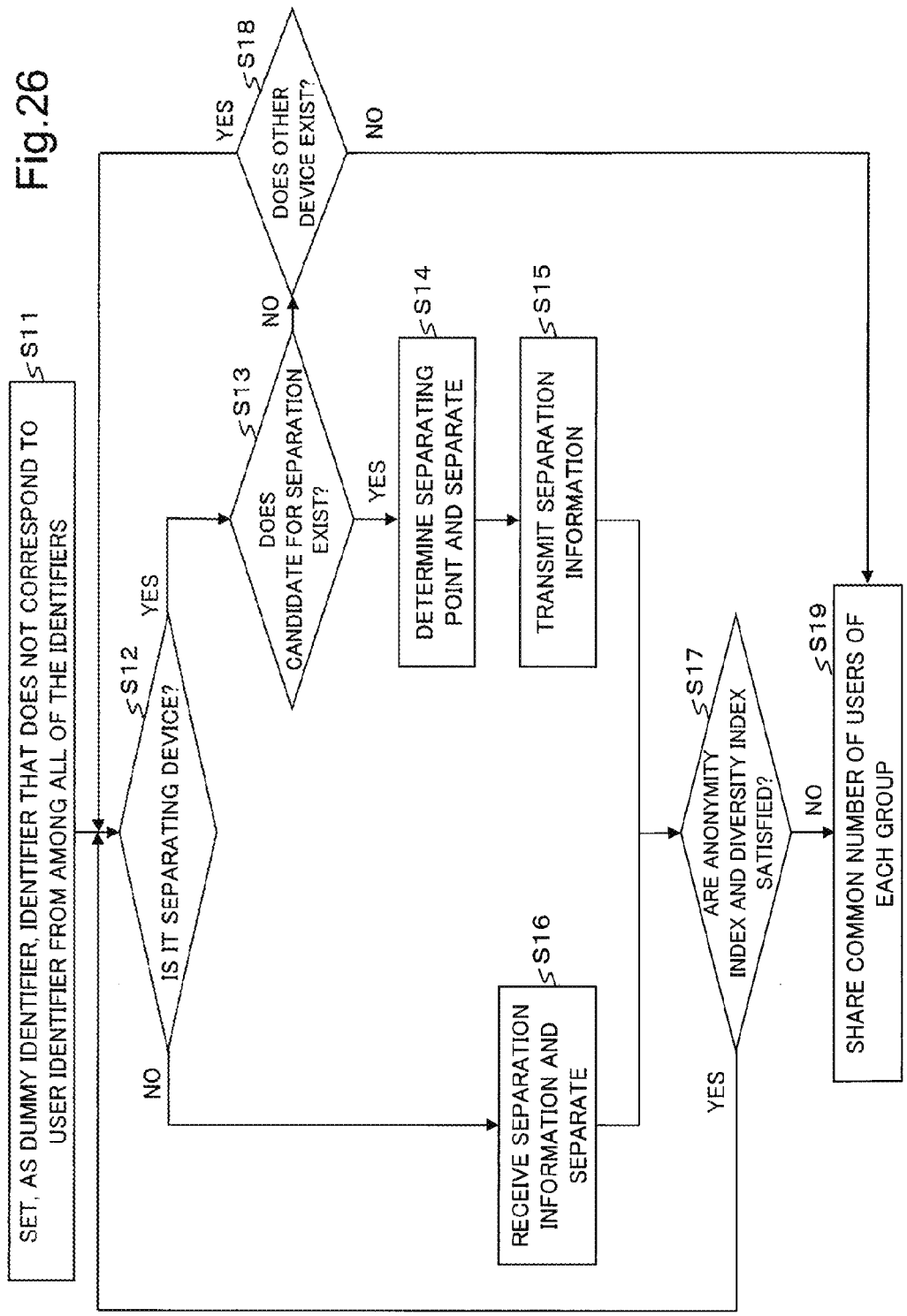
FIG. 26 is a flowchart of operations of a distributed anonymization device 700 of the fifth exemplary embodiment.

Referring to FIGS. 25 and 26, a functional configuration of a distributed anonymization device 700 of a fifth exemplary embodiment is described.

FIG. 25 is a block diagram illustrating a configuration of the distributed anonymization device 700 of the fifth exemplary embodiment. As shown in FIG. 25, the distributed anonymization device 700 includes a storing unit 720, a setting unit 730, a separating unit 750, a transmitting unit 760, and a determining unit 780. These have the same configurations as the first storing unit 120, the first setting unit 130, the first separating unit 150, the first transmitting unit 160, and the first determining unit 180, respectively.

The storing unit 720 stores a user identifier which is a user's identifier existing as a pieces of data and personal information in association with one another.

The setting unit 730 sets, as a dummy identifier, the identifier that does not correspond to the user identifier from among all of the externally-notified identifiers.

The separating unit 750 separates all the identifiers including the dummy identifier set by the setting unit 730 into groups.

The transmitting unit 760 transmits to another device the separation information indicating content of identifiers in each of separated groups.

The determining unit 180 determines, each of groups, whether or not proportion of identifiers existing in both the abovementioned distributed anonymization device and the other device satisfy a predetermined anonymity index.

FIG. 26 is a flowchart of operations of the distributed anonymization device 700 of the fifth exemplary embodiment. In FIG. 26, the distributed anonymization device 700 includes a receiving unit and a generating unit (not shown), for explanation of operations.

As shown in FIG. 26, the setting unit 130 of the distributed anonymization device 700 sets, as a dummy identifier, the identifier that does not correspond to the user identifier from among all of the externally-notified identifiers (step S11).

Next, the distributed anonymization device 700 confirms whether or not the device 700 in itself is a device conducting separation.

If determining the device 700 in itself is not the device conducting separation, the distributed anonymization device 700 waits for transmission of the separation information from other device. When receiving the separation information from other device, the receiving unit (not shown) of the distributed anonymization device 700 separates stored data based on the received separation information (step S16). After that, a process of the distributed anonymization device 700 proceeds to step S17.

In step S12, when determining the device 700 in itself is the device conducting separation, the separating unit 150 of the distributed anonymization device 700 determines whether or not a candidate of the separating point to separate data of all the identifiers exists (step S13).

Determining the candidate of the separating point exists, the separating unit 150 separates data on all the identifiers at the separating point, and a process proceeds to step S15. Determining the candidate of the separating point does not exists, a process proceeds to step S18. In step S18, if it is likely that the candidate of the separating point exists, the distributed anonymization device 700 outputs information asking other device to transmit the separation information, a process proceeds to step S12. When it is known that the candidate of the separating point does not exists in other device, a process proceeds to step S19.

In step S15, the transmitting unit 160 transmits the separation information indicating content of the identifiers in each of the separated groups to other device.

The determining unit 180 determines whether or not data after separation satisfies the anonymity index and the diversity index (step S17). If the distributed anonymization device 700 does not store the sensitive information, the determining unit 180 has no need to determine whether or not the anonymity index and the diversity index are satisfied.

If it is determined that the index is satisfied, a process proceeds to step S12. If it is determined that the index is not satisfied, a process proceeds to step S19.

In step S19, the generating unit (not shown) of the distributed anonymization device 700 cancels the latest separation and returns mutual data to the latest state in which the index is satisfied. The generating unit shares the common number of users of each group with other device. When calculating the common number of users with other device, the generating unit may calculate using MPC or SMPC. Sharing the common number of users, the generating unit generates the combination anonymization table.

As described above, the distributed anonymization device 700 of the fifth exemplary embodiment can conduct the distributed anonymization processing without the risk that existence of the user data is leaked to the other business operators.

The present inventions are explained by referring to each exemplary embodiment. However, the inventions are not limited to the exemplary embodiments. It is to be understood that to the configurations and details of the invention of the present application, various changes can be made within the scope of the invention of the present application by those skilled in the art.

Figure 27:
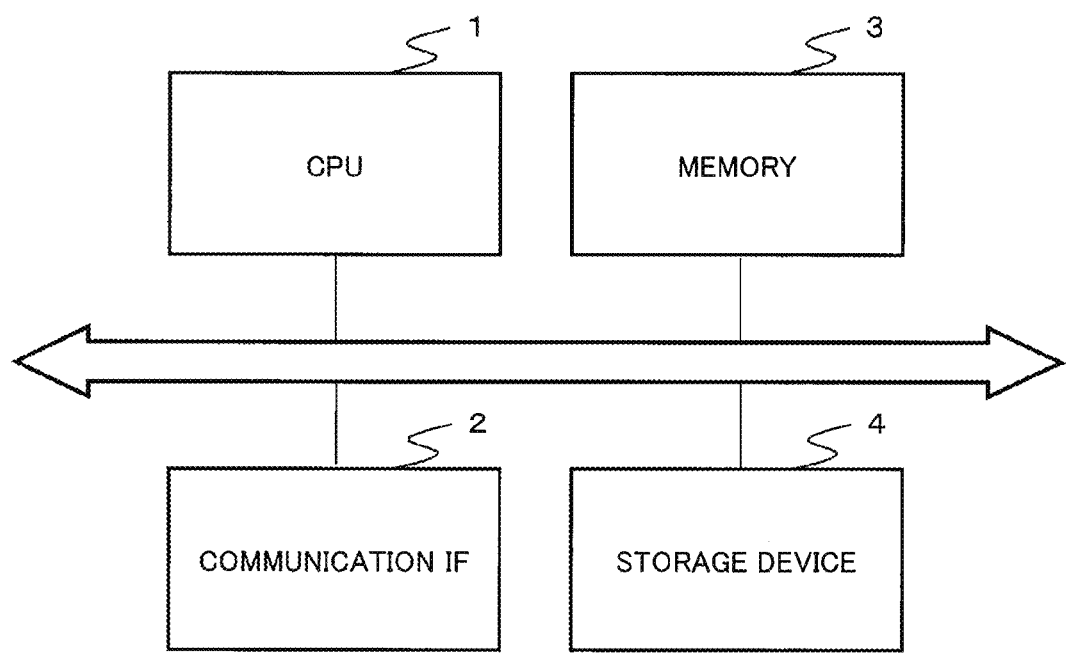
FIG. 27 is a block diagram illustrating an example of a hardware configuration of the first distributed anonymization device 100 of the first exemplary embodiment.

FIG. 27 is a block diagram illustrating an example of a hardware configuration of the distributed anonymization device 100 of the first exemplary embodiment.

As shown in FIG. 27, each part configuring the distributed anonymization device 100 is materialized by a computer device including a CPU (Central Processing Unit) 1, a communication IF (Interface) 2 for network connection, memory 3, and a storage device 4 storing programs.

The configuration of the distributed anonymization device 100 is not limited to the computer device in FIG. 27.

For example, the first acquiring unit 110, the first transmitting unit 160 and the first receiving unit 170 may be materialized by the communication IF 2.

The CPU 1 operates an operating system and wholly controls the distributed anonymization device 100. The CPU 1 reads programs and data from a recording medium, for example, mounted on a driving device to the memory 3 and performs various kinds of processes based on the programs and the data.

For example, the first setting unit 130, the first operating unit 140, the first separating unit 150, the first determining unit 180 and the first generating unit 190 may be materialized by the CPU1 and the programs.

The storage unit 4 is e.g. an optical disc, a flexible disc, a magneto-optical disc, an external hard disc, a semiconductor memory, or the like, and records computer programs in a computer-readable manner. The storage device 4 may stores a transforming rule for transforming the interface. The computer programs may be downloaded from an external computer (not shown) connecting to a communication network.

For example, the first storing unit 120 may be materialized by the storage device 4.

The block diagram which is used in each exemplary embodiment described above shows not a configuration with a hardware unit, but blocks with a functional unit. The functional blocks are materialized an arbitrary combination of hardware and software. A means for materializing configuration parts of the distributed anonymization device 100 is not limited. The distributed anonymization device 100 may be materialized by one device physically combined or by a plurality of devices which are configured by connecting two or more devices physically separated via wired connection or wireless connection.

The programs of the invention may be programs for causing a computer to execute each operation described in each exemplary embodiment.

Figure 39:
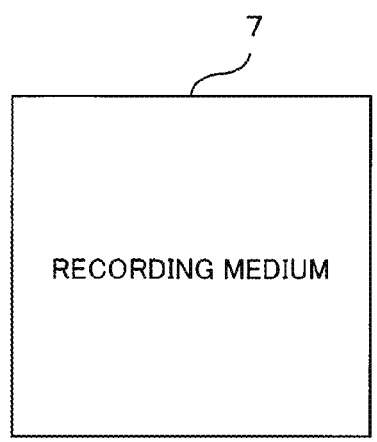
FIG. 39 is a diagram illustrating an example of a recording medium for recording a program of the invention.

FIG. 39 is a diagram illustrating an example of the recording medium (storing medium) 7 recording (storing) the above programs. The recording medium 7 is a non-volatile recording medium for non-transitory storing information. The recording medium 7 may be a transitory recording medium for temporarily storing information. The recording medium 7 records programs (software) for causing a computer device (CPU 1) to execute operations shown in FIG. 26. The recording medium 7 may further record arbitrary programs and data.

The recording medium 7, which records a code of the above-mentioned program (software), may be supplied to the computer equipment, and CPU1 may read and carry out the code of the program which is stored in the recording medium 7. Or, CPU 1 may make the code of the program, which is stored in the recording medium 7, stored in the memory 3. That is, the exemplary embodiment includes an exemplary embodiment of the recording medium 7 recording the program, which is executed by the computer equipment (CPU 1), transitory or non-transitory.

While having described an invention of the present application referring to the embodiments, the invention of the present application is not limited to the above mentioned embodiments. It is to be understood that to the configurations and details of the invention of the present application, various changes can be made within the scope of the invention of the present application by those skilled in the art.

This application claims priority from Japanese Patent Application No. 2011-124398 filed on Jun. 2, 2011, the contents of which are incorporation herein by reference in their entirety.

DESCRIPTION OF THE REFERENCE NUMERALS

1 CPU
2 communication IF
3 memory
4 storage device
5 recording medium
100, 500, 600 first distributed anonymization device
110 first acquiring unit
120 first storing unit
130 first setting unit
140, 145 first operating unit 150 first separating unit
160 first transmitting unit
170 first receiving unit
180 first determining unit
190, 195 first generating unit
200 second distributed anonymization device
210 second acquiring unit
220 second storing unit
230 second setting unit
240 second operating unit
250 second separating unit
260 second transmitting unit
270 second receiving unit
280 second generating unit
300 identifier managing device
400 information providing device
700 distributed anonymization device
720 storing unit
730 setting unit
750 separating unit
760 transmitting unit
780 determining unit
1000 distributed anonymization system

The invention claimed is:

1. A distributed anonymization device, comprising a processor configured to:
store a user identifier and information on a user in association with one another;
separate the stored user identifier and a dummy identifier which is an identifier different from the user identifier, in a plurality of inputted identifiers, into groups;
transmit to another device; information on the identifiers included in the separated groups;
determine, on each of the groups, whether or not proportion of identifiers existing in both the above mentioned distributed anonymization device and the other device satisfies a predetermined anonymity index; and
set, as a dummy identifier, the identifier that is different from the stored user identifier in the plurality of inputted identifiers,
wherein the information on the identifiers included in the separated groups is separation information indicating content of the identifiers in the separated groups.

2. The distributed anonymization device according to claim 1, wherein the processor is further configured to determine, on each of the groups after the separation, whether or not an existence index is satisfied, the existence index being a proportion of the number of the user identifiers to all the identifiers included in the groups.

3. The distributed anonymization device according to claim 1, wherein the processor is further configured to cancel the latest separation and generate a combination anonymization table in a case where the processor determines the anonymity index or the existence index is not satisfied.

4. The distributed anonymization device according to claim 3, wherein the processor is further configured to generate the combination anonymization table including data on the one or more dummy identifiers.

5. The distributed anonymization device according to claim 3, wherein the processor is further configured to generate the combination anonymization table lacking data on the one or more user identifiers.

6. The distributed anonymization device according to claim 1, wherein the processor is further configured to associate, as the information on a user, a value with the dummy identifier.

7. The distributed anonymization device according to claim 6, wherein the processor is further configured to associate, as the information on a user, values in a certain range with the dummy identifier.

8. The distributed anonymization device according to claim 6, wherein the processor is further configured to associate the value of the dummy identifier, on the basis of distribution of the value that is the information on the user on the user identifier.

9. A distributed anonymization method, comprising:
storing a user identifier and information on a user in association with one another,
separating the stored user identifier and a dummy identifier which is an identifier different from the user identifier, in a plurality of inputted identifiers, into groups,
transmitting to another device, information on the identifiers included in the separated groups,
determining, on each of the groups, whether or not proportion of identifiers existing in both the abovementioned distributed anonymization device and the other device satisfies a predetermined anonymity index,
setting, as a dummy identifier, the identifier that is different from the stored user identifier in the plurality of inputted identifiers, and
wherein the information on the identifiers included in the separated groups is separation information indicating content of the identifiers in the separated groups.

10. The distributed anonymization method according to claim 9, wherein when the determination is conducted, it is determined, on each of the groups after the separation, whether or not an existence index is satisfied, the existence index being a proportion of the number of the user identifiers to all the identifiers included in the groups.

11. A non-transitory computer readable medium which records a program causing a computer to execute processes of
storing a user identifier and information on a user in association with one another,
separating the stored user identifier and a dummy identifier which is an identifier different from the user identifier, in a plurality of inputted identifiers, into groups,
transmitting to another device, information on the identifiers included in the separated groups,
determining, on each of the groups, whether or not proportion of identifiers existing in both the abovementioned distributed anonymization device and the other device satisfies a predetermined anonymity index, and
setting, as a dummy identifier, the identifier that is different from the stored user identifier in the plurality of inputted identifiers,
wherein the information on the identifiers included in the separated groups is separation information indicating content of the identifiers in the separated groups.

12. The non-transitory computer readable medium according to claim 11, which records the program causing the computer to execute a process of
determining, on each of the groups after the separation, whether or not an existence index is satisfied, the existence index being proportion of the number of the user identifiers to all the identifiers included in the groups, when the determination is conducted.

13. A distributed anonymization device, comprising
storing means for storing a user identifier and information on a user in association with one another;
separating means for separating the stored user identifier and a dummy identifier which is an identifier different from the user identifier, in a plurality of inputted identifiers, into groups;

transmitting means for transmitting to another device, information on the identifiers included in the separated groups;

determining means for determining, on each of the groups, whether or not proportion of identifiers existing in both the abovementioned distributed anonymization device and the other device satisfies a predetermined anonymity index; and setting means for setting, as a dummy identifier, the identifier that is different from the stored user identifier in the plurality of inputted identifiers, wherein the information on the identifiers included in the separated groups is separation information indicating content of the identifiers in the separated groups.

* * * * *